(12) United States Patent
Volpi

(10) Patent No.: US 12,325,533 B2
(45) Date of Patent: Jun. 10, 2025

(54) UNMANNED AERIAL VEHICLE

(71) Applicant: Lucio Volpi, Tarzana, CA (US)

(72) Inventor: Lucio Volpi, Tarzana, CA (US)

(*) Notice: Subject to any disclaimer, the term of this patent is extended or adjusted under 35 U.S.C. 154(b) by 0 days.

(21) Appl. No.: 18/515,680

(22) Filed: Nov. 21, 2023

(65) Prior Publication Data

US 2024/0317396 A1    Sep. 26, 2024

Related U.S. Application Data

(63) Continuation of application No. 18/160,062, filed on Jan. 26, 2023, now Pat. No. 11,827,354, which is a continuation of application No. 17/068,701, filed on Oct. 12, 2020, now Pat. No. 11,572,167, which is a continuation of application No. 15/760,094, filed as application No. PCT/US2017/025794 on Apr. 3, 2017, now Pat. No. 10,836,484.

(60) Provisional application No. 62/323,723, filed on Apr. 17, 2016.

(51) Int. Cl.

| | | |
|---|---|---|
| B64D 47/00 | (2006.01) |
| B25J 9/06 | (2006.01) |
| B25J 11/00 | (2006.01) |
| B25J 13/02 | (2006.01) |
| B25J 15/00 | (2006.01) |
| B25J 19/02 | (2006.01) |
| B64C 39/02 | (2023.01) |
| B64U 10/13 | (2023.01) |
| B64U 10/14 | (2023.01) |
| B64U 30/20 | (2023.01) |
| B64U 30/26 | (2023.01) |
| B64U 101/00 | (2023.01) |
| B64U 101/26 | (2023.01) |

(52) U.S. Cl.
CPC ............... B64D 47/00 (2013.01); B25J 9/06 (2013.01); B25J 11/00 (2013.01); B25J 13/02 (2013.01); B25J 15/00 (2013.01); B25J 19/023 (2013.01); B64C 39/024 (2013.01); *B64U 10/13* (2023.01); *B64U 10/14* (2023.01); *B64U 30/20* (2023.01); *B64U 30/26* (2023.01); *B64U 2101/00* (2023.01); *B64U 2101/26* (2023.01); *B64U 2201/20* (2023.01)

(58) Field of Classification Search
CPC .. B64F 1/32; B64F 1/005; B60L 53/60; B60L 53/80; A47G 29/122; A47G 29/141; B64C 39/024; B64D 1/12
See application file for complete search history.

(56) References Cited

U.S. PATENT DOCUMENTS

| | | | |
|---|---|---|---|
| 8,167,234 B1 * | 5/2012 | Moore | B64C 37/00 244/17.23 |
| 2009/0050750 A1 * | 2/2009 | Goossen | B64D 1/22 901/14 |

* cited by examiner

*Primary Examiner* — Justin M Benedik
(74) *Attorney, Agent, or Firm* — David M. Kleiman

(57) ABSTRACT

An unmanned aerial robotic vehicle (UARV) that can fly to an object such as a palm tree, hover in place adjacent to the object, mount itself securely and releasably to a mounting location on the object using a mounting mechanism, and which uses an incorporated utility system for performing one or more utilitarian functions, such as use of a cutting tool to trim palm tree branches and foliage.

20 Claims, 12 Drawing Sheets

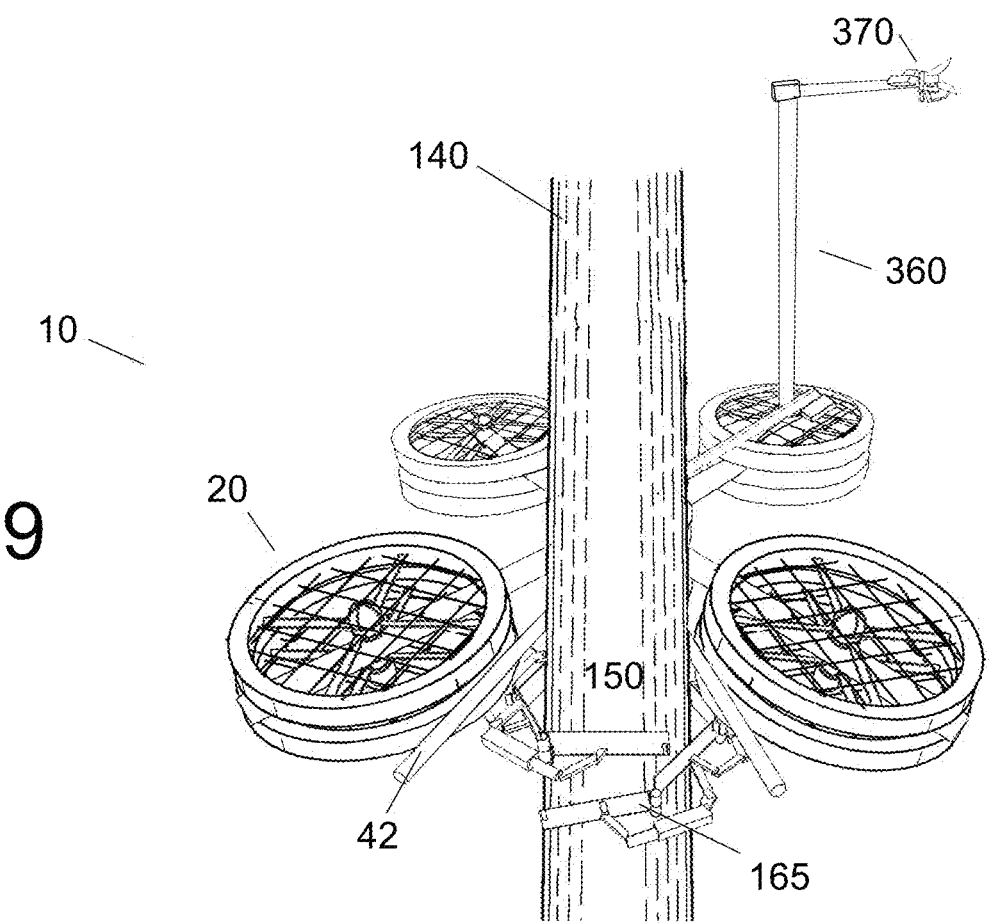
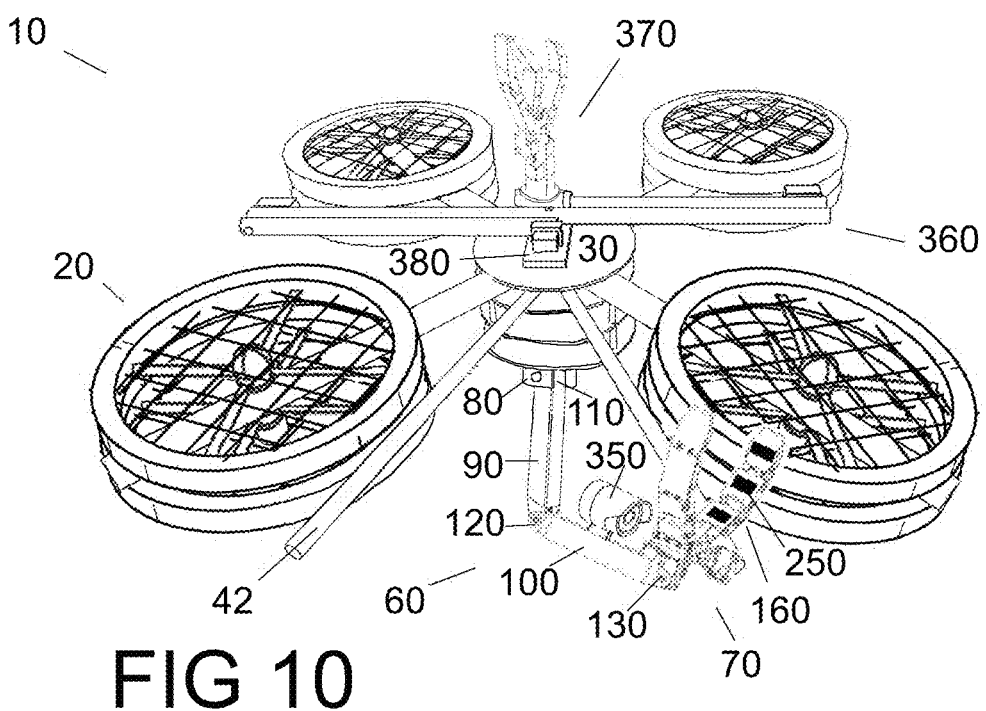

UNMANNED AERIAL VEHICLE

This application is a continuation of and claims the benefit of priority to U.S. patent application Ser. No. 18/160,062 filed Jan. 26, 2023, which is a continuation of U.S. patent application Ser. No. 17/068,701 filed Oct. 12, 2020, issued as U.S. Pat. No. 11,572,167, which is a continuation of U.S. patent application Ser. No. 15/760,094 filed Mar. 14, 2018, issued as U.S. Pat. No. 10,836,484 on Nov. 17, 2020, which is a national stage entry of international patent application PCT/US17/25794 filed on Apr. 3, 2017, and which claims the benefit of priority of U.S. provisional patent application No. 62/323,723 filed on Apr. 17, 2016. The applicant claims the benefit of priority to each of the aforementioned applications and the contents of each are hereby fully incorporated by reference.

TECHNICAL FIELD

The present invention is in the field of mobile robots. More specifically unmanned aerial robotic vehicles capable of performing various utilitarian tasks.

SUMMARY OF THE INVENTION

The present invention is for an unmanned aerial robotic vehicle (hereinafter "UARV") that can fly through the air to an object, hover in place adjacent to the object, and mount itself temporarily at a location on the object using a mounting mechanism.

A first preferred exemplary embodiment of the contemplated UARV comprises an omni-directional vertical lift drone with one or more thrusters attached to a UARV body; a mounting mechanism comprising one or more grip arms having a plurality of linked plates; and a retractable moveable tool arm having a proximal end attached to the UARV body and a distal end with a tool component used for performing one or more utilitarian functions.

The UARV can fly through the atmosphere to a location adjacent to a mounting location on an object, such as a tree, utility pole, building etc. . . . The UARV can hover next to the mounting location while the grip arms are extended and maneuvered around the mounting location with the assistance of one or more guide posts. The preferred embodiment utilizes a dynamic balance system that shifts the weight of the UARV internal battery as the grip arms move during mounting and dismounting operations, and/or during utility system operations, to help maintain the balance or orientation of the UARV. Once the grip arms are in place at the mounting location the UARV is mounted to the object by applying a retraction force to the grip arms that wraps them substantially around and firmly against the outer edge of the object at the mounting location. Once the grip arms are clamped firmly onto the object at the mounting location the UARV will be securely and releasably mounted.

In other contemplated embodiments described herein the mounting mechanism comprises a mounting arm having a proximal end attached to the UARV body and a distal end with a grip mechanism having a plurality of gripping jaws. In such embodiments it is contemplated that the mounting arm is maneuvered so as to place the gripping jaws around the mounting location. Once the gripping jaws are in place at the mounting location the UARV is mounted to the object by applying a clamping force to the gripping jaws that moves them towards one another so that the gripping jaws clamp onto the object at the mounting location. Preferably the mounting arm is then locked in position relative to the UARV body. With the grip mechanism clamped onto the mounting location and the mounting arm locked in position the UARV will be securely and releasably mounted to the object at the mounting location.

It is contemplated that when mounted to an object the UARV flight systems, including the thrusters, could remain powered on and operational in what may be referred to as a holding mode. In a holding mode the mounting of the UARV to an object with the mounting mechanism will provide added stabilization during utility system operations while flight systems are still engaged. Use of such a holding mode may be desirable if the UARV will be moving frequently from one mounting location to another, and powering flight systems on and off repeatedly could result in power consumption surges that are not desirable, or excessive mechanical wear on components that are repeatedly and frequently accelerated between on and off.

In other circumstances where the UARV will remain at a particular mounting location for a significant length of time it may be desirable to power off the flight systems to help conserve energy, as well as reduce noise and electromagnetic interference. Accordingly, once securely mounted to the object by the mounting mechanism the UARV can powering down flight systems, including the thrusters, and enter into what may be referred to as a parked mode.

It is contemplated that there may be a number of applications for the UARV of the present invention to be in a parked mode where the UARV is frequently located at a particular mounting location for substantial period of times. Such applications may include, by way of example and not limitation, established locations where the UARV will generally be located or parked for conducting tree trimming, repairs or maintenance, communications, surveillance, security, and/or UARV power supply charging at or near the location. Accordingly in addition to embodiments of the UARV that use grip arms or a mounting arm with a grip mechanism, it is contemplated that there will be embodiments that use a docking system for a UARV in parked mode where the mounting mechanism comprises a vehicle dock connector that is configured to form a releasable coupling connection with an object docking port attached at a mounting location on an object (such as a tree or utility pole). In such embodiments the mounting mechanism with a vehicle dock connector may be the only UARV mounting mechanism, or it may be in addition to one or more other UARV mounting mechanisms.

When using the docking system a releasable coupling connection is established between the vehicle dock connector and the object docking port at the mounting location. Once the releasable coupling connection is established the UARV will be securely mounted on the object at the mounting location and the UARV may power down one or more of its systems, including but not limited to any of the thrusters, and can remain mounted at the location for an extended period of time. It is contemplated that such docking systems may incorporate one or more conductive buses that are used to transfer power and/or data between the UARV and the dock.

It is contemplated that the UARV of the present invention may be configured for use in various operations including but not limited to tree trimming, repair and maintenance, surveillance, security and defense, and communications. Once securely mounted to an object by the mounting mechanism the UARV can conserve energy and reduce noise and electromagnetic interference by powering down the thrusters and any other systems that may be necessary to keeping the UARV airborne.

It is contemplated that the UARV may have one or more systems for performing functional operations mounted on, or in, the UARV body. Such systems may include, by way of example and not limitation, cutting systems, surveillance systems, weapons systems, and/or communications systems. In some contemplated embodiments such systems are incorporated into, or configured to be utilized by, a tool component attached to a tool arm. In a preferred embodiment the tool component is detachable from the tool arm, allowing different tool components to be installed on the UARV tool arm for different operations. In a preferred embodiment the UARV tool arm is moveable and is used to maneuver the tool component into position to perform one or more utilitarian functions with the tool component, such as for example trimming tree foliage with a cutting system, performing a repair operation with a repair tool system, conducting surveillance with a surveillance system, targeting and firing a weapon system, or engaging in communications using a communications system.

In some embodiments of the UARV it is contemplated that in addition to the mounting mechanism for mounting UARV to an object such that it may power down its flight systems, there will be a smaller tool arm grip either fixedly located at, or moveable to, a position that is substantially adjacent to the tool component of the tool arm. It is contemplated that the tool arm grip would be capable of maneuvering through small spaces and gripping and holding securely small objects (e.g. small branches and twigs) in place when the tool component is being used. In such an embodiment it is contemplated that the UARV may be able to perform operations while still hovering in the air and not using the mounting mechanism to mount to an object. Use of the tool arm grip will provide enhanced stabilization. This can extend the useful range of the UARV to locations where mounting with the mounting mechanism is not practical or desirable.

It is contemplated that in some embodiments of the UARV that one or more debris screens would be incorporated to protect one or more portions of the UARV, such as the thrusters, from any debris or obstacles that may result from airborne transit or performance of the UARV utilitarian operations.

It is contemplated that embodiments of the UARV of the present invention may operate autonomously from preprogrammed instructions contained in a controller mounted on or in the UARV, or may be operated remotely by an operator using a remote controller that permits the operator to control the UARV in near real-time.

Commercial systems for the contemplated embodiments of the UARV of the present invention are contemplated where a user (i.e. customer) creates an online account to obtain UARV services through a network interface (i.e. an internet connected computing device). Through the network interface a user may access a cloud based computing system of an owner or operator of a UARV of the present invention and communicate over the network user and account information, service site location, desired service type, desired service schedule, and service payment information. Payments may be processed by the UARV owner or operator through conventional payment systems (e.g. credit card, PayPal, bank transfer etc. . . . ), and then the customer service information (e.g. site coordinates and schedule) may be communicated to and/or stored in a UARV.

These and other features and aspects of the present invention will be described in greater below.

BRIEF DESCRIPTION OF THE DRAWINGS

FIG. 9 is an elevated front perspective view of the UARV of the present invention showing the UARV mounted to an object at a mounting location with a mounting mechanism comprising grip arms.

FIG. 10 is an elevated front perspective view of a technician embodiment of the UARV of the present invention with a mounting mechanism having a mounting arm with a single mounting grip mechanism, and a tool arm with an attached dexterous hand tool component.

DETAILED DESCRIPTION OF THE INVENTION

Figure 1:
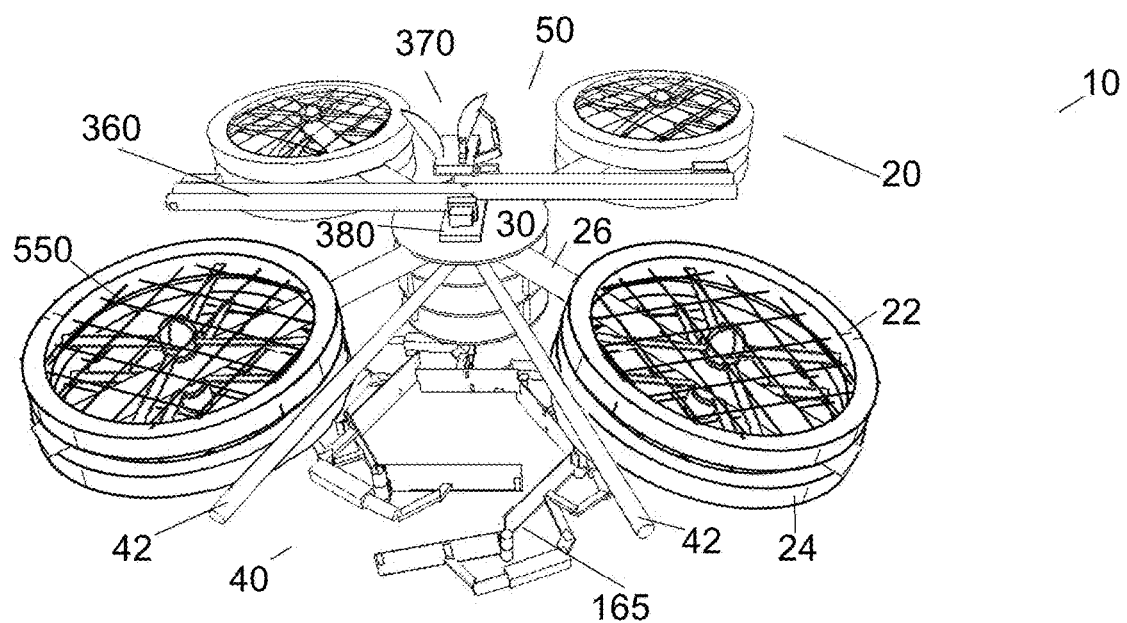
FIG. 1 is an elevated front perspective view of a preferred tree trimming embodiment of the UARV of the present invention having a mounting mechanism comprising grip arms and a tool arm in a retracted transport configuration.

Referring to FIG. 1 a first preferred embodiment of the present invention for an unmanned aerial robotic vehicle (UARV) 10 is shown. In the illustrated embodiment the UARV 10 comprises an omni-directional vertical lift drone, that operates generally by way of example and not limitation like that described and shown in U.S. Pat. No. 3,053,480 the contents of which are hereby fully incorporated by reference. In the embodiment shown in FIG. 1 UARV 10 utilizes eight thrusters 20 that each comprise a rotary wing assembly (i.e. helicopter rotors). Thrusters 20 are attached by one or more thruster booms 26 to UARV body 30. Attached to UARV body 30 is a mounting mechanism 40 and at least one utility system 50.

In the first preferred embodiment of FIG. 1 the eight rotary wing assembly thrusters 20 are preferably arranged in a back-to-back configuration as shown, with upper thrusters 22 being in an opposed orientation to lower thrusters 24. Upper thrusters 22 and lower thrusters 24 are oriented and configured to operate such that their respective thrusts may be cumulative. It should be noted that the type, number, size, power, and orientation of thrusters used for the present invention can vary depending upon the configuration (e.g. size and weight), operating environment, and purpose of the UARV. A thruster can be any device, including a rotary wing assembly, that either alone or in combination with other thrusters can produce sufficient lift and/or thrust to move the UARV from one location to another.

Figure 2:
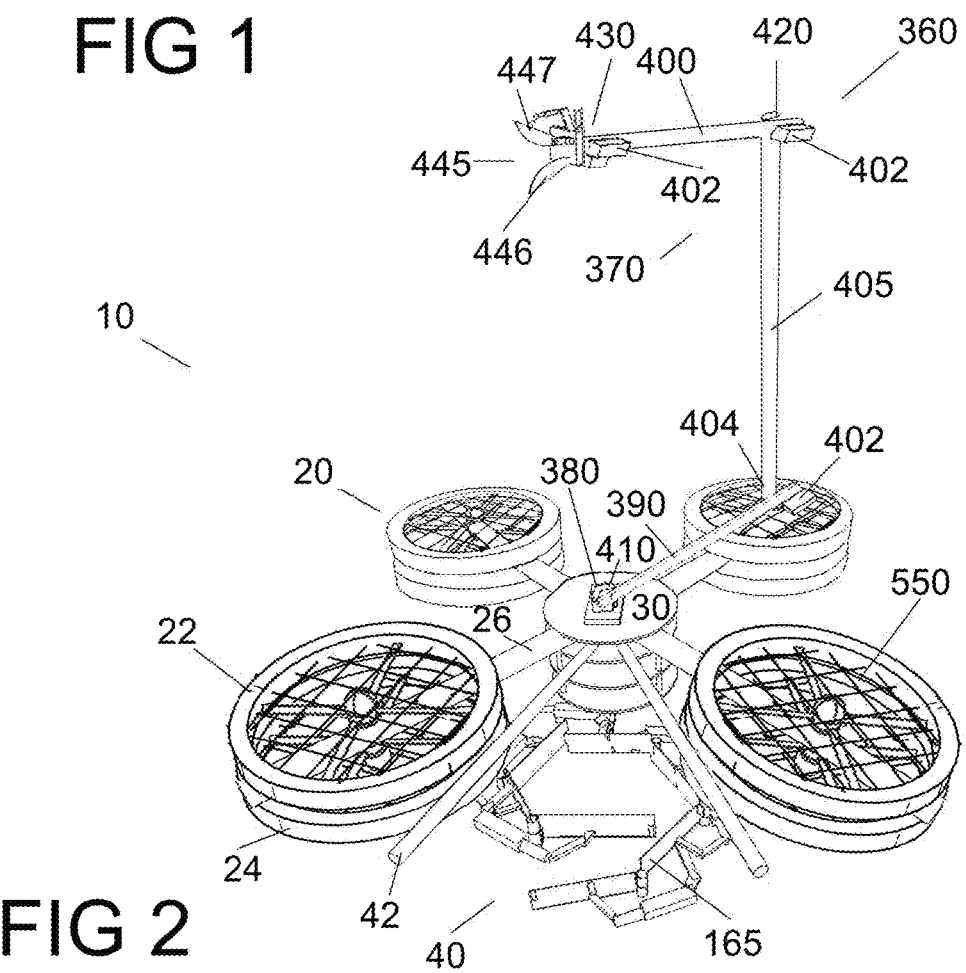
FIG. 2 is an elevated front perspective view of a preferred tree trimming embodiment of the UARV of the present invention having a mounting mechanism comprising grip arms and a tool arm in an extended operational configuration.
Figure 3:
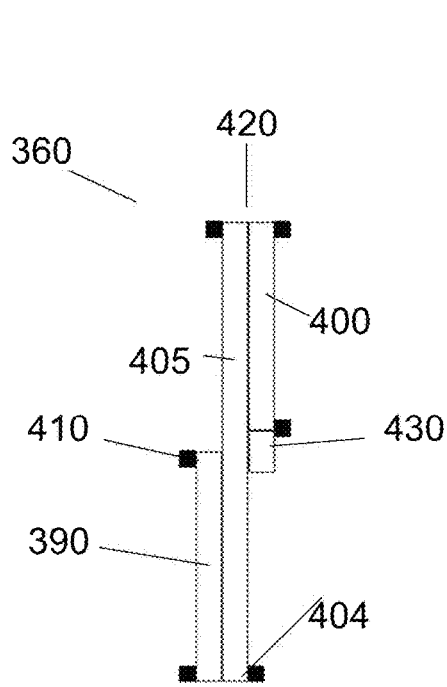
FIG. 3 is a top view of an embodiment of an UARV tool arm of the present invention in a retracted configuration.
Figure 4:
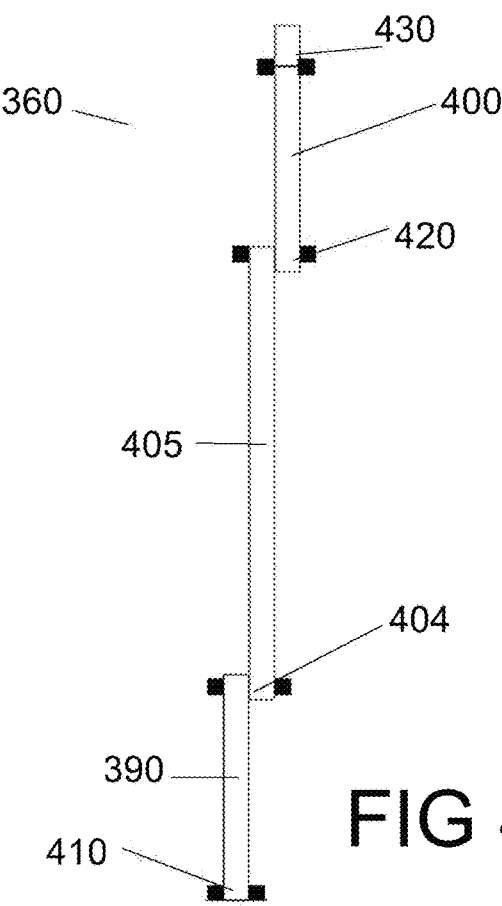
FIG. 4 is a top view of an embodiment of an UARV tool arm of the present invention in an extended configuration.
Figure 5:
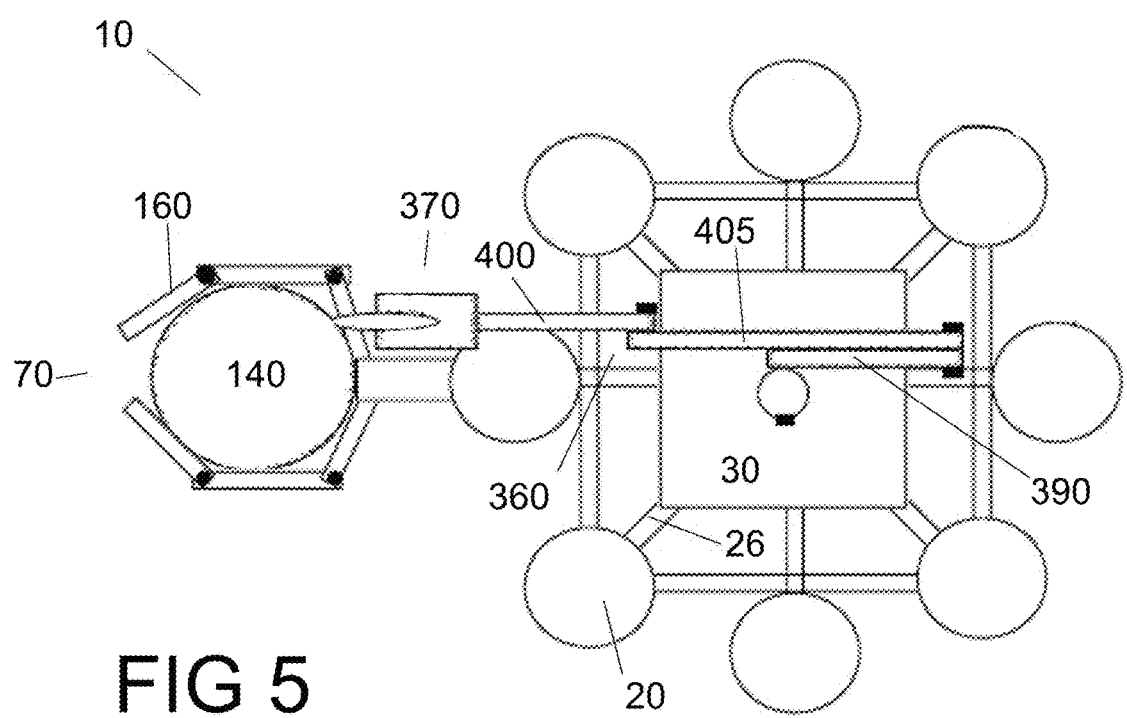
FIG. 5 is a top view of an embodiment of an UARV of the present invention mounted onto a cylindrical object (such as a tree trunk) with a UARV mounting mechanism comprising a mounting arm and grip mechanism, and a UARV tool arm in an extended operational configuration.
Figure 6:
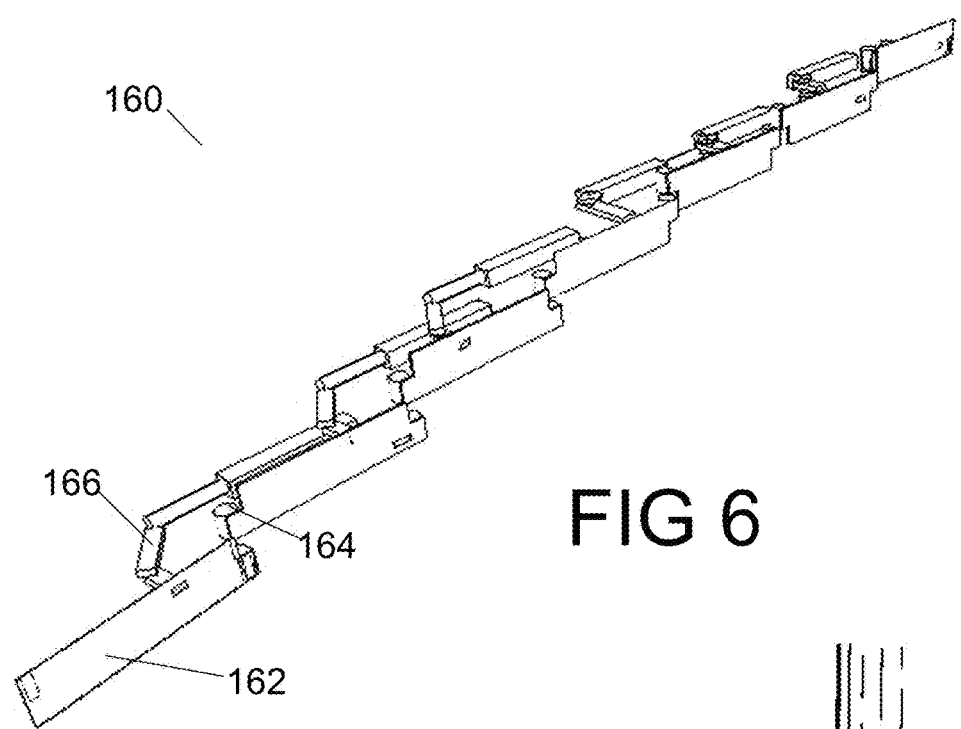
FIG. 6 is an elevated interior side perspective view of a multi-segmented grip arm of the present UARV invention in an open extended configuration.
Figure 7:
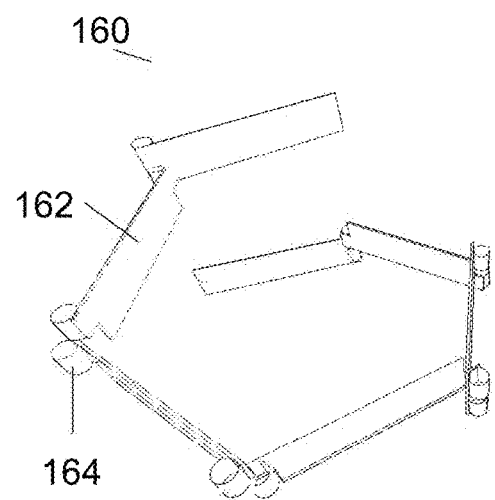
FIG. 7 is an elevated top side perspective view of a multi-segmented grip arm of the present UARV invention in a retracted closed configuration.
Figure 8:
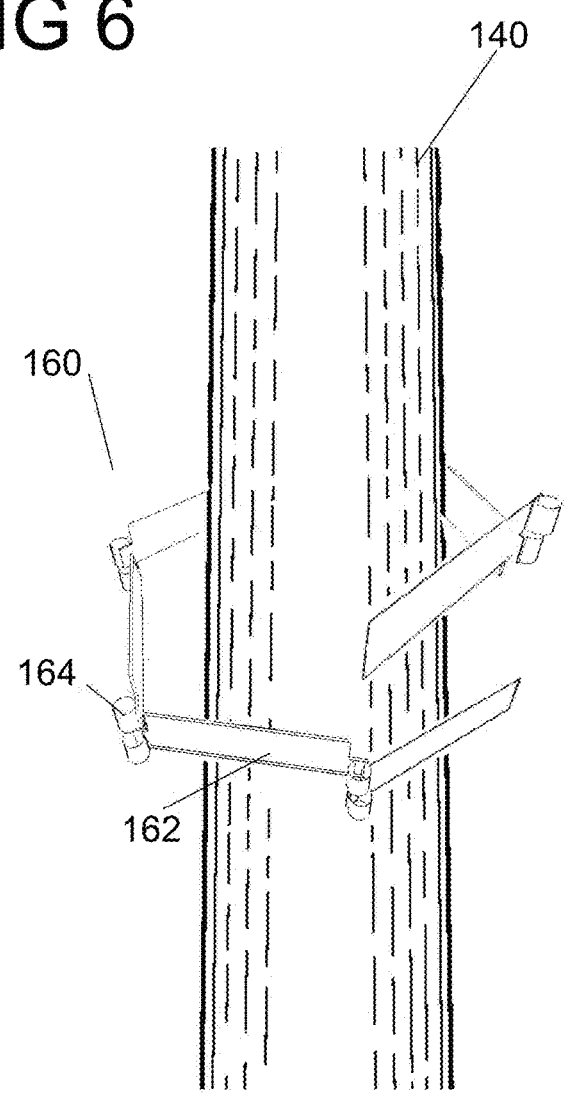
FIG. 8 is an elevated top side perspective view of a multi-segmented grip arm of the present UARV invention in a retracted closed configuration around an object.

Referring to FIGS. 1 and 2 in the illustrated first preferred embodiment mounting mechanism 40 comprises one or more multi-segmented mounting grip arms 165 attached to UARV body 30. Referring to FIGS. 6-8 each mounting grip arm 165 is comprised of a plurality of plates 162 that are movably joined together in a step fashion by plate connectors 164. In a preferred embodiment plates 162 are light weight titanium. Titanium bolts, washers and nuts may be used in each plate connector 164. Connected to each plate 162 is a plate actuator 166 that is used to position plates 162 in relation to one another, thus opening (i.e. extending) and closing (i.e. retracting) multi-segmented mounting grip arm 165 in a step like fashion. This multi-segmented step like configuration of mounting grip arm 165 facilitates mounting grip arm 165 being able to securely grip objects of different sizes without having plates 162 overlap. Also referring to FIGS. 1 and 2 it is contemplated that the UARV 10 of the present invention will utilize one or more mounting guide posts 42 attached to UARV body 30 to help facilitate the mounting of UARV 10 to a cylindrical object such as a tree trunk or utility pole with mounting mechanism 40.

Figure 11:
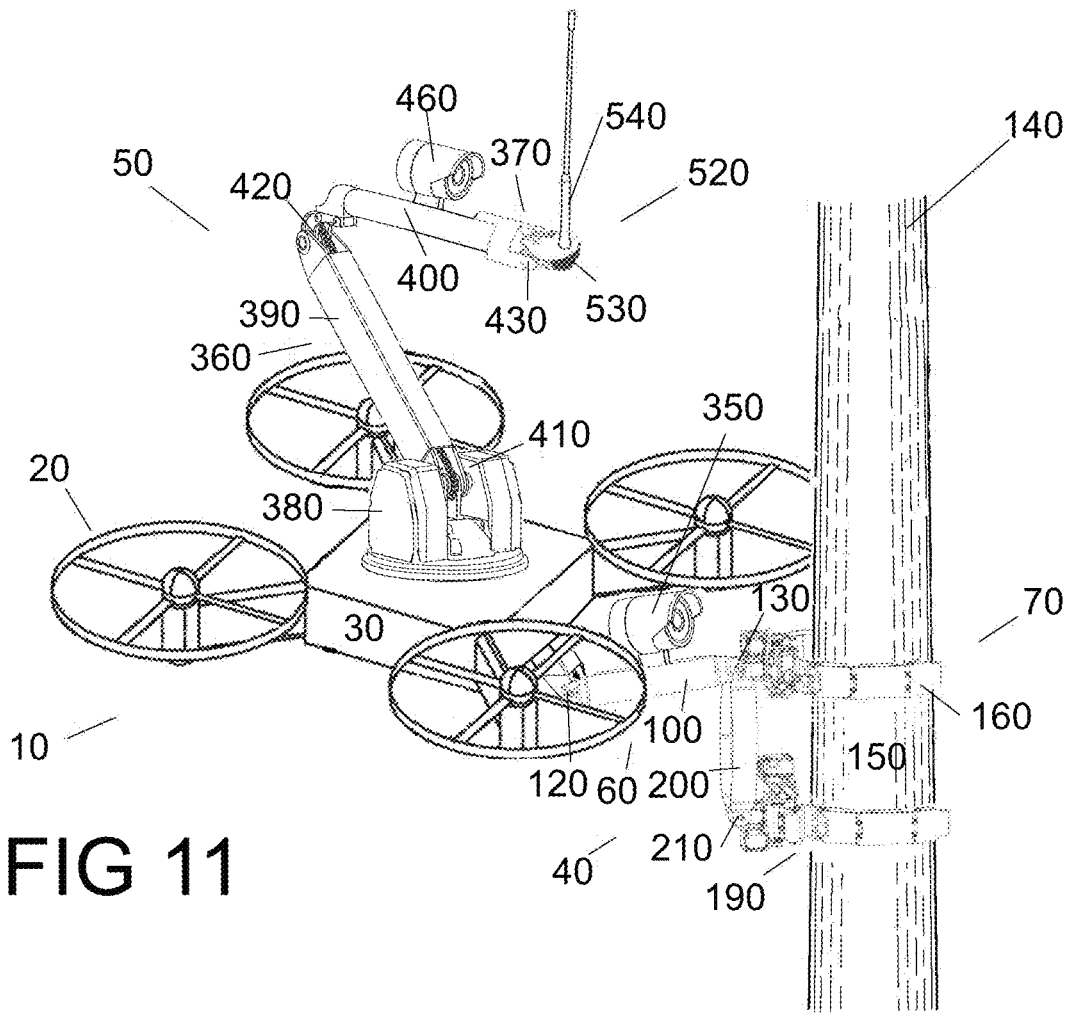
FIG. 11 is an elevated right front perspective view of a communications embodiment of the UARV of the present invention having a mounting arm with a double mounting grip mechanism, and a tool arm with an attached communications system tool component, showing the UARV mounted to an object at a mounting location with said double mounting grip mechanism.

Referring to FIGS. 9-11 in other contemplated embodiments mounting mechanism 40 comprises a mounting arm 60 and a mounting grip mechanism 70, with the mounting arm 60 being rotatable and extendable towards and away from UARV body 30. In such embodiments mounting arm 60 is attached to UARV body 30 with a mounting arm turret 80 that can be rotated by a mounting arm motor (not shown) that is on or in UARV body 30. Mounting arm turret 80 is attached pivotally to a proximal mounting arm portion 90. Proximal mounting arm portion 90 is attached pivotally to distal mounting arm portion 100. Mounting grip mechanism 70 is attached at distal juncture 130 of distal mounting arm portion 100. Proximal mounting arm portion 90 can pivot about turret juncture 110 with mounting arm turret 80. Distal mounting arm portion 100 can pivot about proximal juncture 120 with proximal mounting arm portion 90. Mounting grip mechanism 70 can pivot about distal juncture 130 with distal mounting arm portion 100.

Mounting grip mechanism 70 in the embodiments illustrated in FIGS. 9, 10 and 11 is a multi-directional and rotational grapple that mimics hand and wrist movements, thereby providing the UARV mounting arm 60 with the ability to grasp onto an object 140, such as a tree trunk or utility pole, at a mounting location 150. Mounting grip mechanism 70 comprises a plurality of preferably arcuate shaped multi-segmented clamp jaws 160 that may be used to grasp object 140 at a mounting location 150 on said object. It is contemplated that mounting grip mechanism 70 may be constructed in a number of different ways as shown and described, by way of example and not limitation, in U.S. patent application publication US2005/0135915 A1 (Hall) the contents of each of which are hereby fully incorporated by reference; U.S. Pat. No. 4,993,912 the contents of each of which are hereby fully incorporated by reference; Chinese published patent application CN 104972460A the contents of each of which are hereby fully incorporated by reference; Chinese patent CN 105500362 the contents of each of which are hereby fully incorporated by reference; Design and Control of a Soft and Continuously Deformable 2D Robotic Manipulation System, Marchese et. al, in 2014 IEEE International Conference on Robotics and Automation (ICRA), IEEE, New York, 2014 the contents of each of which are hereby fully incorporated by reference; and A Recipe For Soft Fluidic Elastomer Robots, Marchese et. al., SOFT ROBOTICS Volume 2, Number 1, 2015 Mary Ann Liebert, Inc., DOI: 10.1089/soro.2014.0022 the contents of which are hereby fully incorporated by reference.

Figure 27:
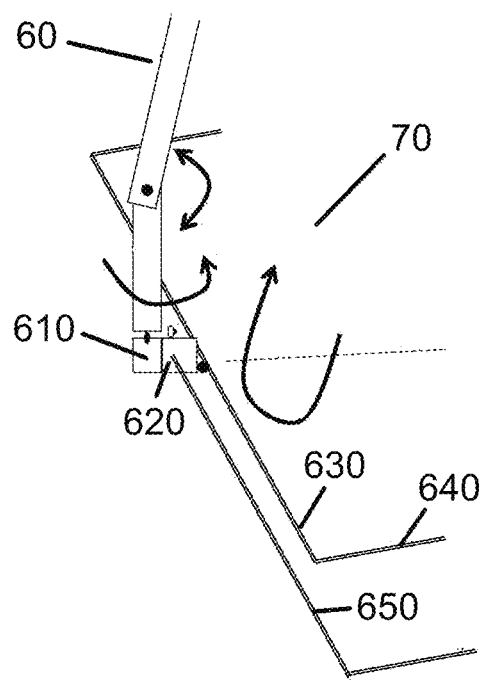
FIG. 27 is an elevated left side schematic view of a super grip hand embodiment of the mounting grip mechanism for the UARV of the present invention.
Figure 28:
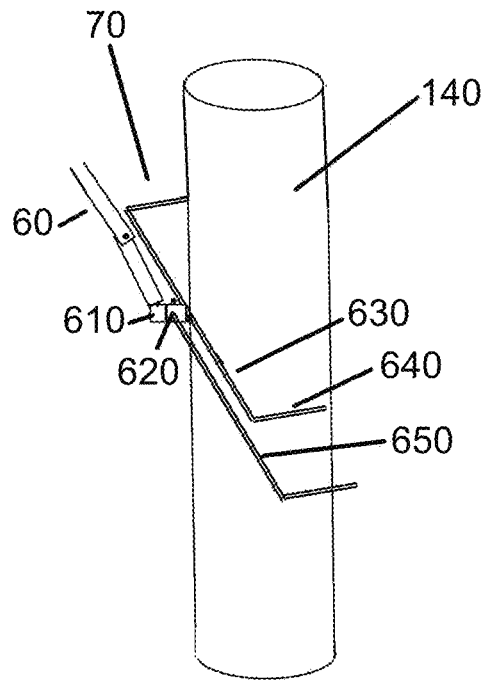
FIG. 28 is an elevated left side schematic view of a super grip hand embodiment of the mounting grip mechanism for the UARV of the present invention engaged with an object to be mounted.

Referring to FIGS. 27-28 it is contemplated that in some embodiments the UARV mounting grip mechanism 70 will be in the form of a "super grip hand" configuration. In the super grip hand configuration mounting grip mechanism 70, which is attached to the distal end of motorized mounting arm 60 (attached to the UARV body not shown), comprises a swivel motor 610, grip motor 620, grip arm 630, grip hand 640 and counter rotating arm 650. When mounting grip mechanism 70 is maneuvered into contact with object 140 grip motor 620 will rotate grip arm 630 until grip arm 630 tightens onto object 140. Once grip arm 630 tightens onto object 140, as detected by one or more sensors incorporated into mounting mechanism 70 (e.g. a torque or motion sensor), grip motor 620 rotates counter rotating arm 650 until it also tightens onto object 140 (as detected by one or more sensors). Once grip arm 630 and counter rotating arm 650 are tightened onto object 140 the UARV will be mounted to object 140. Swivel motor 610 prevents rotational forces from being transmitted to the UARV body through mounting arm 60.

Figure 29:
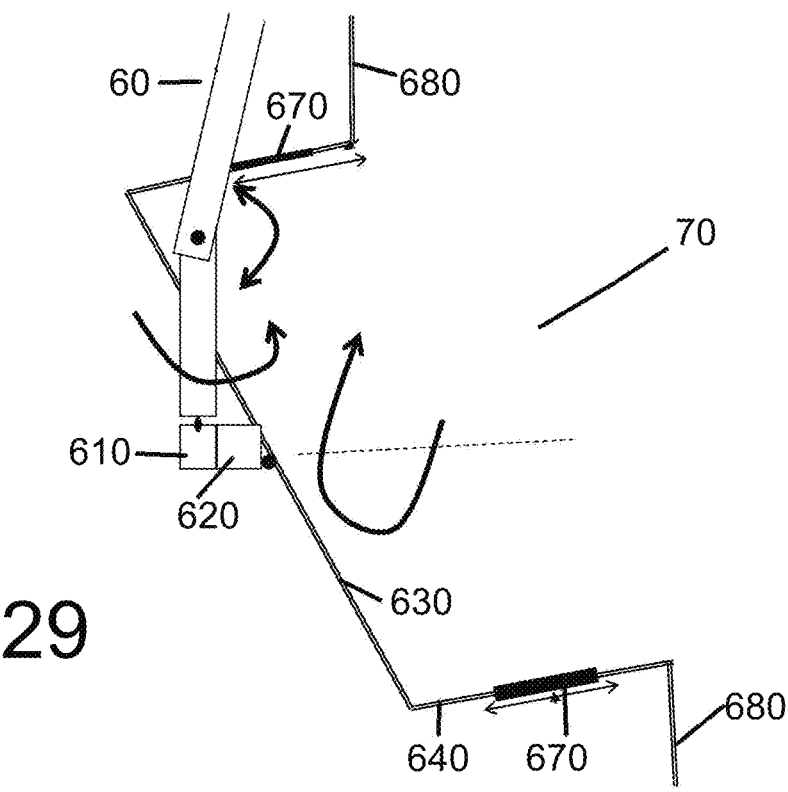
FIG. 29 is an elevated left side schematic view of a super grip s hand embodiment of the mounting grip mechanism for the UARV of the present invention.
Figure 30:
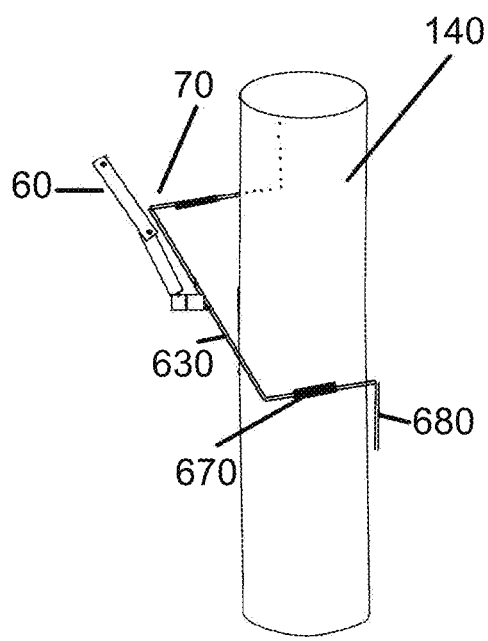
FIG. 30 is an elevated left side schematic view of a super grip s hand embodiment of the mounting grip mechanism for the UARV of the present invention engaged with an object to be mounted.
Figure 31:
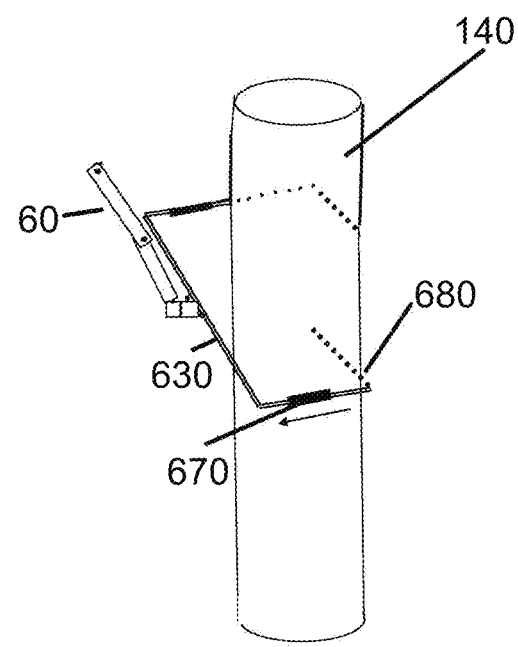
FIG. 31 is an elevated left side schematic view of a super grip s hand embodiment of the mounting grip mechanism for the UARV of the present invention mounted on an object.

Referring to FIGS. 29-31 it is contemplated that in some embodiments the UARV mounting grip mechanism 70 will be in the form of a "super grip s hand" configuration. In the super grip s hand configuration mounting grip mechanism 70, which is attached to the distal end of motorized mounting arm 60 (attached to the UARV body not shown), comprises a swivel motor 610, grip motor 620, grip arm 630, grip hands 640, actuators 670, and vertical arms 680. When mounting grip mechanism 70 is maneuvered into contact with object 140 grip motor 620 will rotate grip arm 630 until grip arm 630 tightens onto object 140. Once grip arm 630 tightens onto object 140, as detected by one or more sensors incorporated into mounting mechanism 70 (e.g. a torque or motion sensor), actuators 670 rotate vertical arms 680 so as to be moved from an orientation that is substantially parallel and adjacent to said object 140 (e.g. vertical) to a substantially perpendicular (e.g. horizontal) orientation behind said object 140 so that mounting grip mechanism 70 is more fully wrapped around object 140. Once grip arm 630 and vertical arms 680 are tightened onto and around object 140 the UARV will be mounted to object 140. Swivel motor 610 prevents rotational forces from being transmitted to the UARV body through mounting arm 60.

It is contemplated that actuators for mounting grip arms 165 and mounting grip mechanism jaws 160 may be operated using a commonly available hydraulic system, gasoline motors, and/or electrical motor system. It is further contemplated that in some embodiments of the present invention that the power source for any electrical motor system and/or hydraulic system of the UARV mounting mechanism 40 may be located remotely from the UARV (e.g. in a unit on the ground, in a vehicle, or attached to the object to be mounted), and that such remote power source would be operatively connected to mounting mechanism 40 by a tether cable having a sufficient length to reach between the location of the power source and the desired mounting location of UARV 10. It is also contemplated that in other embodiments the power source for any electrical motor system and/or hydraulic system of mounting mechanism 40 may be incorporated onto or into the UARV body 30.

Referring to FIG. 11 it is contemplated that in some embodiments mounting arm 60 may further comprise one or more supplemental distal mounting arm portions 200 that each terminate with a supplemental mounting grip mechanism 190. It is contemplated that each supplemental distal mounting arm portion 100 and each supplemental mounting grip mechanism 190 will have a similar configuration as the adjacent and more proximal distal mounting arm portion 100 and proximal mounting grip mechanism 70 respectively. However, it is also contemplated that in embodiments with multiple mounting grip mechanisms that there may be variations in the configurations of mounting grip mechanisms. In embodiments with multiple mounting grip mechanisms (e.g. a double mounting grip embodiment, a triple mounting grip embodiment, etc. . . . ) it is contemplated that each successive supplemental distal mounting arm portion 200 would be moveable about the distal juncture 130 of the immediately adjacent and more proximal distal mounting arm portion 100. It is contemplated that each successive supplemental mounting grip mechanism 190 would be moveable about a supplemental juncture 210 with associated supplemental distal mounting arm portion 200. Use of one or more supplemental mounting grip mechanisms 190 can help to improve the security and stability of the UARV 10 when mounting to an object 140. Once mounting grip mechanism jaws 160 are in place the UARV 10 is mounted to the object 140 by applying a force to opposing mounting grip mechanism jaws 160 the jaws are moved towards one another so that the jaws clamp down firmly around the mounting location 150. Preferably the mounting arm 60 is then locked in position relative to the UARV body 30.

Figure 19:
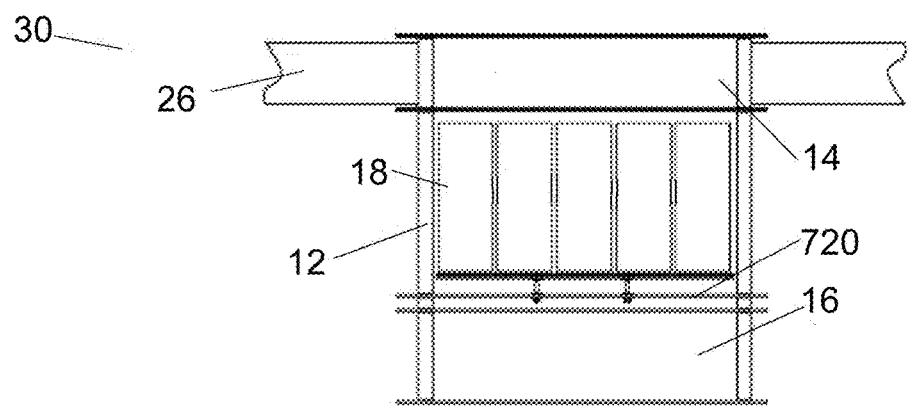
FIG. 19 is a front cross-section view of an embodiment of a UARV body of the present invention.
Figure 20:
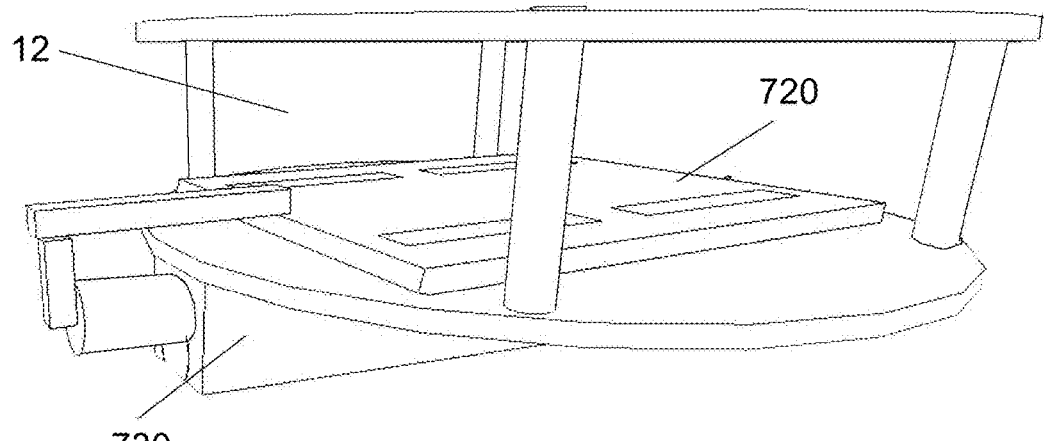
FIG. 20 is an elevated front left view of a battery compartment section of UARV body showing the movable battery support and battery support actuator in an embodiment of the present invention that uses a dynamic balance system.
Figure 21:
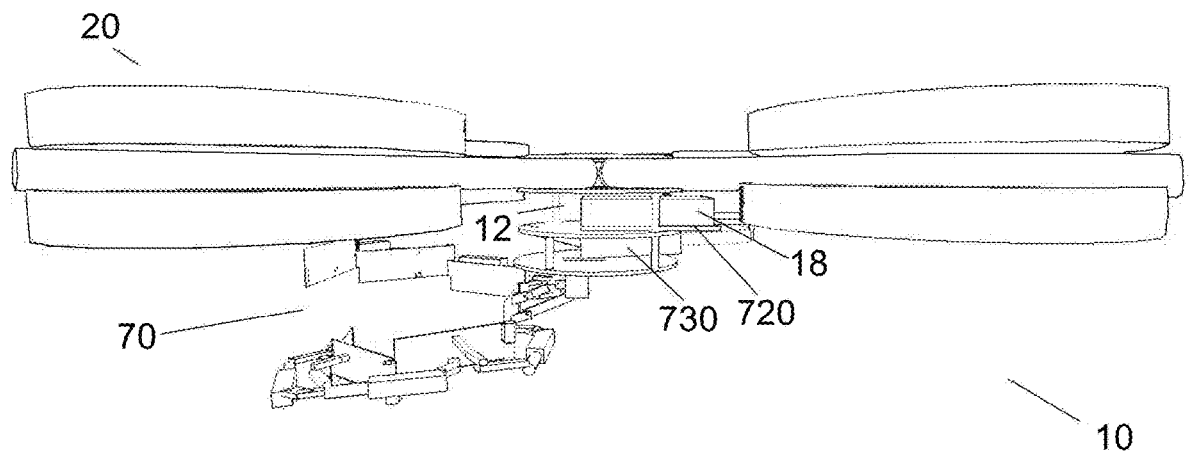
FIG. 21 is a front view of the UARV of the present invention (utility system not shown) that shows an embodiment of UARV body with the dynamic balance system.

Referring to FIGS. 19-21 the preferred embodiment of the present invention utilizes a dynamic balance system that shifts the weight of the UARV internal battery as the mounting mechanism and/or utility system moves during operations to help maintain the balance of the UARV and minimize the power consumed by the thrusters for maintaining UARV balance. Internal UARV battery 18 which represents a substantial portion of the weight of UARV 10 is attached to a movable battery support 720 in battery compartment 12 of UARV body 30. A battery support actuator 730 is attached to movable battery support 720 and can move battery support 720 and attached battery 18 in response to sensed and/or anticipated changes in the orientation or center of gravity of UARV 10. It is contemplated that actuator 730 would be under the control of one or more electronic controllers that receive sensor information on UARV 10 orientation and/or center of gravity, and which may be contained within electronics compartment 16 in UARV body 30. Thus, by way of example, movements of mounting mechanism 40 during mounting or dismounting operations that affect the balance of UARV 10 may be sensed and compensated for through movement of battery 18 effected by actuator 730.

It is contemplated that even in embodiments that use compensatory movements of the battery that the dynamic balance system may also incorporate adjustments to the thrust and/or orientation of one or more thrusters 20 to help maintain the orientation of, and/or stabilize, the UARV 10. It is contemplated that the speed and/or direction of thrusters 20 may be controlled and adjusted independently of one another to achieve desired thrust, lift, speed and/or orientation of UARV 10, with or without the movement of UARV battery 18. It is further contemplated that mounted on or in UARV 10 may be a navigation and control system to help automatically maintain UARV 10 in an orientation, or at a height or speed during mounting and other operations.

It is contemplated that UARV 10 may utilize one or more proximity sensor systems to determine the proximity of UARV 10 to an object 140 to be mounted. Such a proximity sensor system would communicate a proximity alert to an operator of UARV to let them know when UARV 10 was within range for using the mounting mechanism to mount the UARV 10 onto object 140.

It is contemplated that upon initially mounting an object UARV 10 may utilize a secure mounting test system (i.e. locking test) where the movement of UARV 10 is monitored in response to adjustments of thrust from thrusters 20, which may or may not be preprogrammed. If the measured movement of UARV 10 is within a certain range, which may or may not be preprogrammed, then a mounting success signal is generated and transmitted. In response to the mounting success signal an operator of UARV 10, or an autonomous control system of UARV 10, may then power down the flight systems. If the measured movement of UARV 10 is not within a satisfactory range, indicating that the initial mount is not secure, then a mounting alert signal can be generated. In response to the mounting alert signal an operator, or the UARV 10 autonomous control system, may attempt to further secure the mount at the location or attempt to mount at another location.

It is contemplated that while mounted to an object that the secure mounting test system may remain active, such that in the event movement of UARV 10 outside a predetermined range is detected a mount alarm signal can be generated and transmitted. UARV 10 may be preprogrammed to respond to a mount alarm system with one or more actions, such as for example securely erasing any sensitive data or information UARV 10 may contain (in the event of attempted theft), and or powering up flight systems, dismounting, and travelling to a predetermined location using an onboard satellite (i.e. GPS) navigation system.

With the mounting mechanism 40 firmly secured to the mounting location 150 and any mounting arm 60 locked in position the UARV 10 is securely mounted to the object 140 at the mounting location 150. Once securely mounted to the object 140 by the mounting mechanism 40 the UARV 10 may in anticipation of a brief mounting period maintain flight systems powered on and operational in a holding mode, or if an extended mounting period is anticipated it can enter into a parked mode to conserve energy by powering down flight systems such as thrusters 20.

Figure 22:
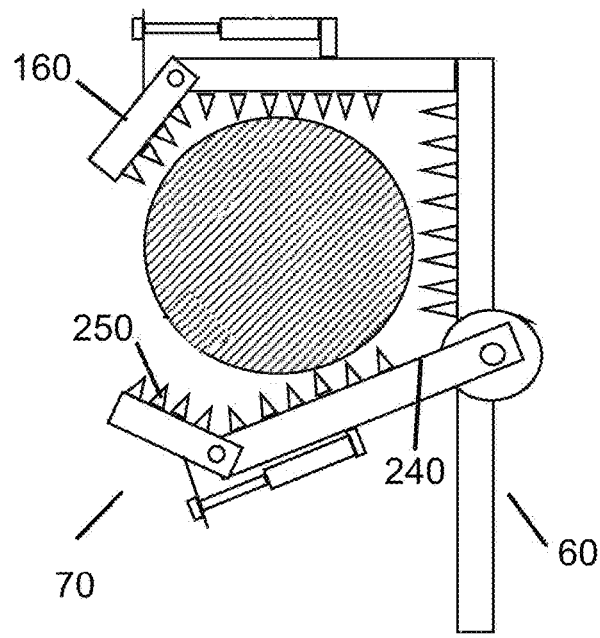
FIG. 22 is a top view of a shark bite embodiment of a hydraulic mounting grip mechanism with grip enhancers for use with the UARV of the present invention.
Figure 23:
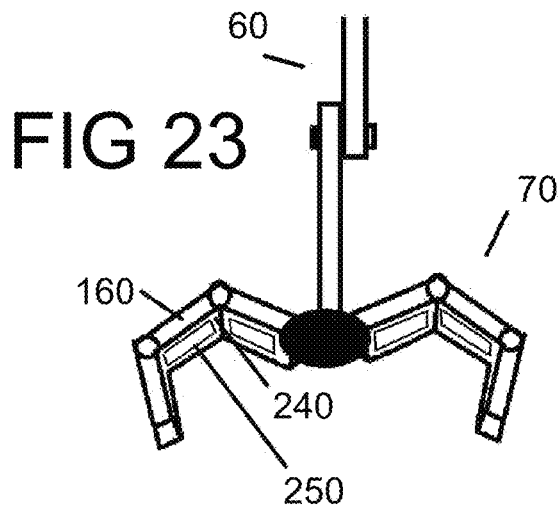
FIG. 23 is an elevated front side perspective view of an embodiment of a mounting grip mechanism having an inflatable membrane as a grip enhancer.
Figure 24:
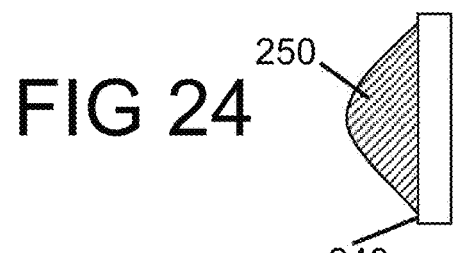
FIG. 24 is a front side section view of a mounting grip mechanism segment of the UARV of the present invention having a grip enhancer that is an inflatable membrane.

Referring to FIGS. 22, 23 and 24 in preferred embodiments of the present invention it is contemplated that one or more inner mounting grip surfaces 240 of mounting grip arms 165 or mounting grip mechanism 70 would have one or more grip enhancers 250. In a first exemplary embodiment it is contemplated that a grip enhancer 250 may comprise a rubber or rubber-like gripping pad to enhance frictional contact and grasping of object 140. In a second exemplary embodiment of a grip enhancer 250 it is contemplated that grip enhancer 250 may comprise one or more protrusions from inner mounting grip surfaces 240 (e.g. one or more cleats, teeth, etc. . . . ) to enhance frictional contact and grasping of object 140. Such protrusions may be made of any suitable material including but not limited to natural or synthetic rubber, plastic, metal, ceramic, or wood. In a third exemplary embodiment of a grip enhancer 250 it is contemplated that grip enhancer 250 may comprise a surface composed of an abrasive material (like sandpaper). In a fourth exemplary embodiment it is contemplated that a grip enhancer 250 may comprise an inflatable membrane 260 capable of being inflated by gas (e.g. air) from a pressurized gas supply carried by, or connected to, UARV 10.

It is contemplated that in some embodiments mounting mechanism 40 may be capable of serving the dual purpose of both mounting UARV 10 at an elevation to an object using a grip mechanism and also being able to act as an undercarriage (i.e. landing gear) for the UARV 10 when it is landed on a substantially horizontal and planar surface. By way of example and not limitation a mounting mechanism may have a grip mechanism comprised of three or more moveable grip mechanism jaws. Accordingly, during a mounting operation to an object with a roughly cylindrical shape, such as a tree trunk or utility pole, two of the grip mechanism jaws opposing one another may be used to grasp the object to mount the UARV to the object, while the other additional jaw of the grip mechanism is retracted to a position so as not to interfere with grasping the object.

During a landing operation of the UARV onto a substantially horizontal and planar surface (e.g. the ground surface, the platform bed of vehicle, deck of a ship, etc. . . . ) all three of the grip mechanism jaws may be maneuvered and opened into a lander configuration where the jaws of the grip mechanism are splayed apart into a substantially coplanar position, with the splayed jaws being substantially equidistant apart. The mounting arm of the mounting mechanism is used to position the grip mechanism into a landing position substantially underneath the UARV body 30 so that the jaws of the grip mechanism when in the lander configuration will make substantial contact with the landing surface. In such a configuration the mounting mechanism will act as an undercarriage that supports and maintains the UARV body 30 above the landing surface when the UARV thrusters are powered off.

It should be noted that the aforementioned embodiment of a lander configuration with a grip mechanism having three jaws is merely an exemplary embodiment. Other configurations are contemplated where a mounting mechanism may be used as an undercarriage that has a grip mechanism with a plurality of jaws that is a different number than three jaws (e.g. four jaws, five jaws, etc. . . . ), and/or the use of a mounting mechanism having one or more supplemental grip mechanisms that can also be used in a lander configuration (or not).

It is contemplated that there are a number of applications for the UARV of the present invention where the UARV may frequently be located at a particular mounting location for substantial period of times. Such applications may include, by way of example and not limitation, established locations where the UARV will generally remain located for conducting tree trimming, repairs or maintenance, communications, surveillance, security, and/or UARV power supply charging.

Figure 16:
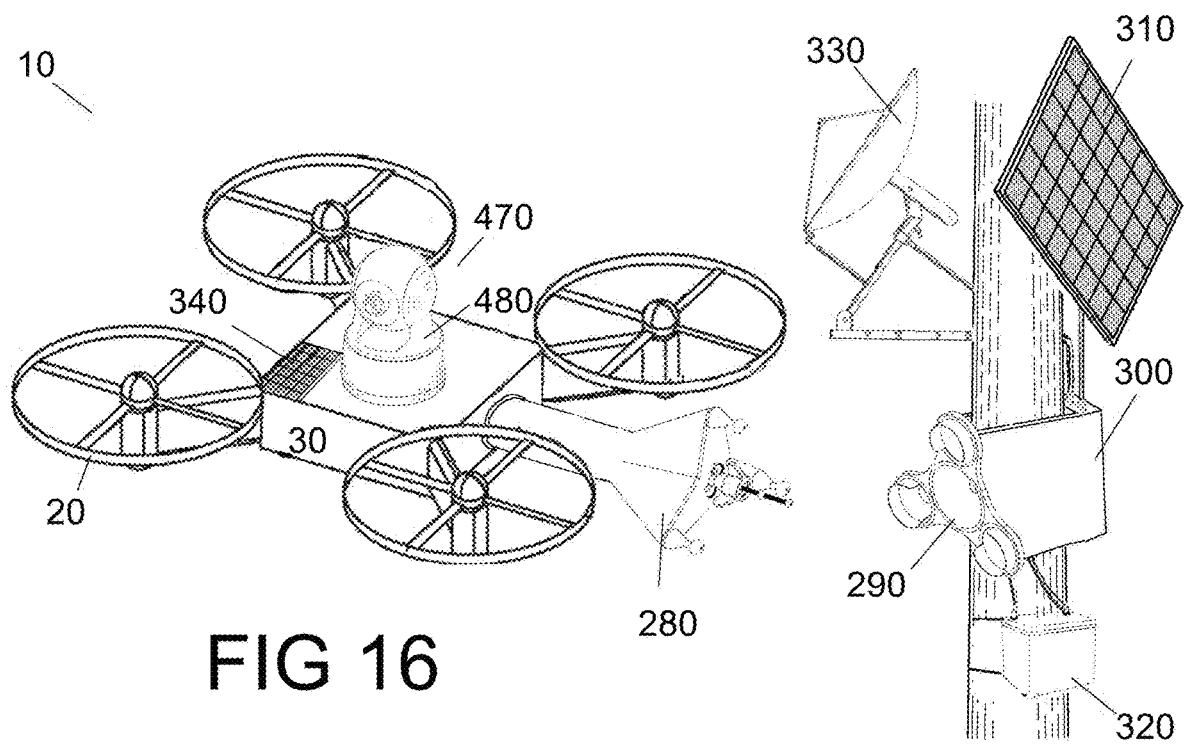
FIG. 16 is an elevated right front perspective view of a docking system for use with a surveillance embodiment of the UARV of the present invention.
Figure 17:
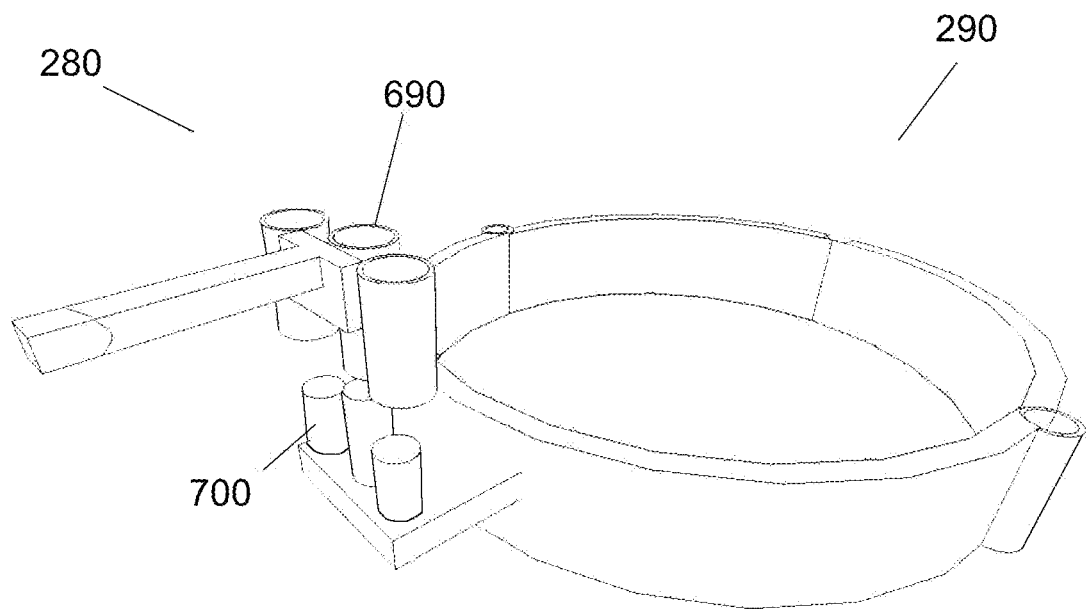
FIG. 17 is an elevated right front perspective view of an exemplary docking system using a vehicle dock connector with a post configuration and an object docking port with post sleeve configuration.
Figure 18:
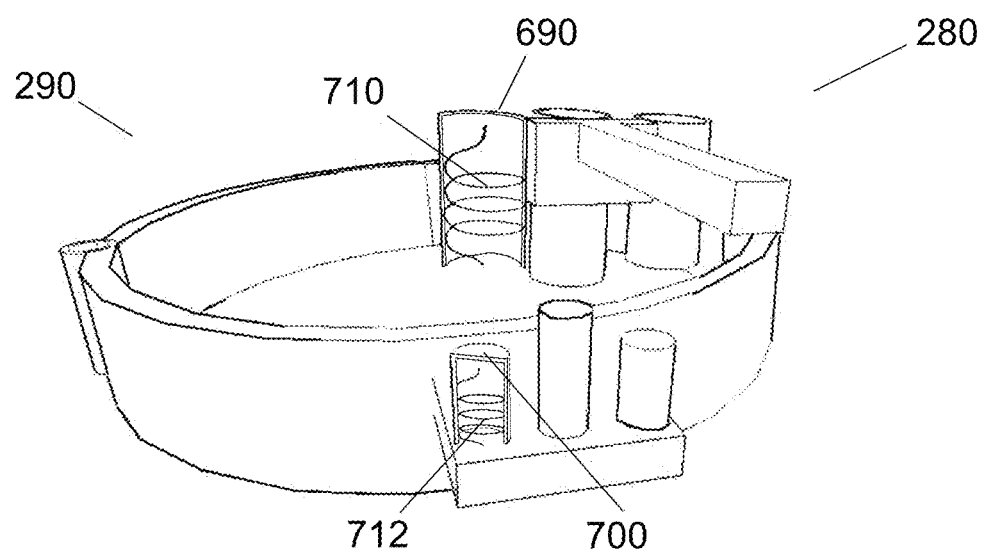
FIG. 18 is an elevated left front perspective view of an exemplary docking system showing the vehicle dock connector of FIG. 17 having in said posts an inductive vehicle power bus coil, and an inductive object power bus coil in said post sleeves.

Referring to FIG. 16 a docking system 270 for longer term mounts in a parked mode for UARV 10 on an object 140 is contemplated where UARV 10 has a mounting mechanism 40 comprising a vehicle dock connector 280 attached to UARV body 30 that is configured to form a releasable coupling connection with an object docking port 290 attached at a mounting location 150 on an object 140 (such as a tree or utility pole). It is contemplated that the vehicle dock connector 280 and object docking port 290 may be configured, by way of example and not limitation, as described and shown in U.S. Pat. No. 8,245,370 (Ritter et. al) the contents of which are hereby fully incorporated by reference. It is further contemplated that vehicle dock connector 280 may be attached to UARV body 30 through a rotatable turret and/or be extendable and retractable to help facilitate connections to docking port 290. Vehicle dock connector 280 may also be attached (permanently or removably) at the end of thruster boom arm 26 or at the end of mounting arm 60. Referring to FIGS. 17-18 an embodiment of the docking system is contemplated where vehicle dock connector 280 comprises one or more vehicle dock connector sleeves 690 and object docking port 290 comprises one or more object docking port posts 700. Vehicle dock connector sleeves 690 attached to UARV body 30 can be positioned over corresponding object docking port posts 700 to form a releasable coupling connection between the UARV vehicle dock connector 280 and the object docking port 290 at the mounting location. The UARV will then be securely mounted on the object at the mounting location and the UARV may power down one or more of its systems, including but not limited to any of the thrusters, and can remain mounted at the location in a parked mode for an extended period.

The docking system of the present invention is further contemplated to include power system, data, and/or communications components that are operably connected to object docking port. By way of example and not limitation it is contemplated that a docking system may have one or more object power stations 300. Object power stations would be mounted on, in, or otherwise in functionally close proximity to an object with a docking port. An object power station 300 may, for example, comprise one or more solar energy panels 310 and/or an energy storage means 320 such as a chemical battery (e.g. lead acid, lithium ion, NiMH, Cadmium), one or more capacitors, fuel cells, etc. . . . Alternatively, an object power station 300 could include a transformer station connected to a high voltage AC power line. Alternatively, an object power station 300 could include a windmill generator, or a hydroelectric generator. Alternatively, an object power station 300 could comprise a connection (e.g. by way of electrical cable) to a power source located away from the object such as a vehicle battery, power inverter, or household electrical outlet.

By way of example and not limitation it is contemplated that a docking system 270 may have one or more associated object communication stations 330. Object communication stations 330 would be mounted on, in, or otherwise in functionally close proximity to an object 140 with an object docking port 290. An object communication station 330 may, for example, comprise one or more antennae and/or transceiver means such as a radio device (e.g. shortwave, cellular, satellite, AM, FM etc. . . . ). It is contemplated that object communication stations 330 may be powered by an object power station 300. It is contemplated that associated with an object communications station 330 would be one or more data storage devices, such that data could be transmitted, received, and stored by the communications station. Such data storage devices may be mounted on or in object docking port 300.

Such a UARV docking system is contemplated to include one or more conducting buses and bus connections between the UARV and the docking port which may be used to transfer power, data, and/or communications to and/or from the systems onboard the UARV. Such conducting buses and bus connections may conduct electrical signals and/or energy, optical signals and/or energy, or any other form of energy or material. Referring to FIG. 18 in a preferred embodiment vehicle dock connector sleeves 690 comprise a coiled vehicle electrical power bus 710 connected to UARV 10 power supply, and object docking port posts 700 comprise a coiled object electrical power bus 712 connected to an object power station providing AC power. When vehicle dock connector sleeves 690 are coupled with object docking port posts 700 coiled vehicle electrical power bus 710 becomes electrically connected to object electrical power bus 712 by electrical induction.

Referring to FIG. 16 an embodiment of the docking system is shown with an object communications station 330 and power station 300 incorporating solar energy panels 340 and energy storage means 320 all attached to object 140 and operably connected to object docking port 290. Object communications station 330 may be used to receive and/or transmit data to or from onboard UARV data and communication systems through object docking port 290. Batteries mounted on or in the UARV body 30 may receive recharging power through object docking port 290 either directly from solar panels 340, directly from energy storage means 320, or a combination of both. It is also contemplated that energy could be transferred to and through object docking port 290 from solar panels mounted on UARV 10 and/or batteries mounted on or in UARV 10. Such energy could be received and stored by energy storage means 320 attached to object 140 for utilization by other components attached to object 140, or for possible later transfer back through object docking port 290 to a connected UARV.

Referring to FIG. 1 in a preferred embodiment of the present invention The maneuvering of the mounting mechanism 40 may be facilitated by the use of a mounting mechanism guidance system comprising one or more mounting guide posts 42. Referring to FIGS. 9-11 it is also contemplated that maneuvering of the mounting mechanism 40 may be facilitated by the use of an electronic mounting mechanism guidance system 350. By way of example and not limitation mounting mechanism guidance system 350 may be a camera system that transmits real time video to a remote operator of the UARV. Mounting mechanism guidance system 350 may also be a machine vision system such as, by way of example and not limitation, what is described and shown in U.S. Pat. No. 6,362,875 (Burkley) the contents of which are hereby fully incorporated by reference.

Referring to FIGS. 1-5 in a preferred embodiment of the invention UARV 10 is equipped with a utility system 50 comprising a tool arm 360 that is used to maneuver at least one tool component 370 into position for performing utilitarian tasks. Tool arm 360 may be constructed of carbon fiber tubing. Tool arm 360 in the first preferred embodiment may be rotated and extended towards and away from UARV body 30. In the preferred embodiment tool arm 360 comprises a tool arm turret 380 that can be rotated by a fool arm motor (not shown) that is on or in UARV body 30. Tool arm turret 380 is attached pivotally to proximal tool arm portion 390 which is attached pivotally to middle tool arm portion 405 which is pivotally attached to distal tool arm portion 400. Tool arm servos 402 are used to move tool arm portions. Proximal tool arm portion 390 can pivot about proximal tool arm juncture 410 with tool arm turret 380. Middle tool arm portion 405 can pivot about middle tool arm juncture 404 and distal tool arm juncture 420. Distal tool arm portion 400 can pivot about distal tool arm juncture 420 with proximal tool arm portion 390. Tool component 370 can pivot about tool component juncture 430 with distal tool arm portion 400. Referring to FIG. 1 in a preferred contemplated embodiment tool arm 360 when not in an extended operational configuration for performing a utilitarian function with tool component 370 can be placed into a retracted transport configuration where it is in a compacted folded position centered over and against UARV body 30. Such a retracted transport configuration of tool arm 360 can help balance and stabilize UARV 10 during flight and enable it to maneuver in more confined locations.

In the preferred embodiment tool component 370 is contemplated to be releasably attached to tool arm 360 so that a variety of different tool components may be used with tool arm 360 depending upon the utilitarian function to be performed by the UARV 10. It is contemplated that in some embodiments tool component may be releasably attached to tool arm 360 as is described and shown, by way of example and not limitation, in U.S. Pat. No. 4,906,123 (Weskamp et al) the contents of which are hereby fully incorporated by reference. In alternative embodiments where UARV 10 is dedicated to performing a single utilitarian function a particular tool component 370 (e.g. a cutting tool) may be fixedly attached to tool arm 360. Tool component 370 may comprise one or more tools of any type, with the toolset of tool component being selected for the task to be performed by the UARV 10 of the present invention.

By way of example and not limitation in a tree trimmer embodiment of UARV it is contemplated that tool component 370 would comprise one or more cutting tools, which may include mechanical shears, rotating saw blades, reciprocating saw blades, chain saws, etc. . . . that are useful for trimming the branches and foliage of a tree that the UARV 10 is mounted on or near to. Referring to FIG. 2 a preferred embodiment of a cutting tool component 445 uses a fixed blade 446 in conjunction with a movable blade 447 powered by a blade actuator. Tree trimmer embodiment of UARV is contemplated to be used with any type of tree or shrubbery, but will be particularly adept at periodic (e.g. annual) trimming of palm trees.

Figure 25:
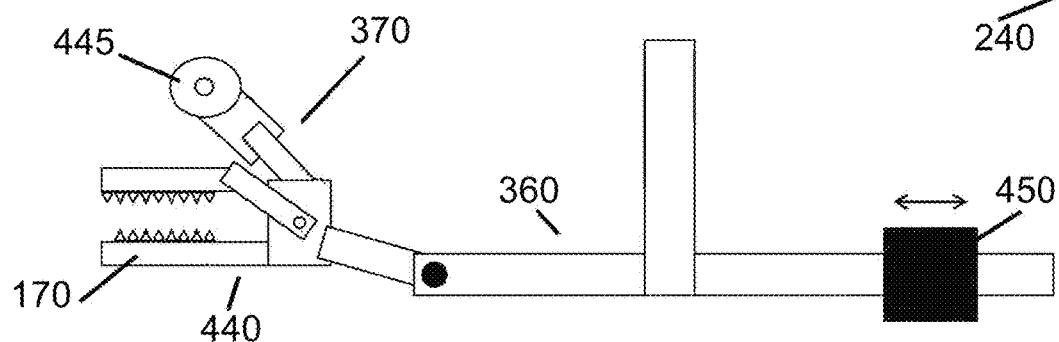
FIG. 25 is a right side view of a tool arm having a tool component with a cutting tool and a tool arm grip mechanism.
Figure 26:
FIG. 26 is a top side view of a tool arm having a tool component with a cutting tool and a tool arm grip mechanism.

Referring to FIGS. 25 and 26 in a contemplated embodiment of a tree trimmer UARV there is a Cut-N-Fly tool component 370 that comprises a tool component grip mechanism 440 that may be fixedly located at, or moveable to, a position adjacent to cutting tool 445. It is contemplated that the tool component grip mechanism 440 would have a functional configuration similar to that of a mounting mechanism grip but with the jaws being smaller in size than the mounting mechanism grip jaws, and also linearly shaped with flat inner surfaces that can make complete contact with each other across at least a portion of their length (similar to the configuration of needle nose pliers). This tool component grip configuration may be able to more effectively maneuver through small spaces and grip smaller branches and twigs to hold them in place when using the tool component 370. It is further contemplated in such a Cut-N-Fly embodiment that tool arm 360 may incorporate a moveable balance weight 450 to help stabilize the tool arm 360 and/or UARV 10 during cutting operations. In circumstances where just the tool component grip mechanism 440 is used, without mounting the UARV 10 to an object with the mounting mechanism 40, it is contemplated that the UARV thrusters 20 would need to maintain power to stabilize the UARV 10 and maintain the UARV 10 in position during cutting operations.

In another embodiment it is contemplated that the UARV 10 is configured as a technician UARV and the tool component 370 comprises one or more conventional tools, alone or in combination, that are used for repair or maintenance operations, such as by way of example and not limitation, a screwdriver with one or more related heads, a hammer, a wrench, a pliers, a socket wrench, a soldering iron and a solder dispenser, an electrical property measurement tool (i.e. a multi-meter), a vice grip, a drill and drill bits, a utility knife and blades, a welding torch, keys, punches, etc. . . .

It is contemplated that the tools of tool component 370 for a technician UARV may be an integral part of tool component 370. Alternatively, tool component may have a dexterous hand-like configuration 590 that may be controlled autonomously, or remotely by an operator, for grasping, utilizing, and then releasing items, such as individual separate tools that may be stored in an accessible tool compartment of UARV. Such a dexterous hand-like configuration of tool component may be like that shown and described, by way of example and not limitation, in U.S. Pat. No. 6,247,738 (Winkel et al) the contents of which are hereby incorporated by reference.

It is contemplated that the maneuvering of the tool component 370 with the UARV tool arm 360, and utilization of the tool component 370 may be facilitated by a tool arm guidance system 460 and/or a tool component guidance system. By way of example and not limitation tool arm guidance system 460 and/or tool component guidance system may be a camera system that transmits real time sensory information to a remote operator of UARV. Such sensory information may include visual information as well as other information such as audio, speed, position, orientation, physical measurements, and tactile feedback. Tool arm guidance system 460 and/or tool component guidance system may also be a machine vision system such as, by way of example and not limitation, what is described and shown in U.S. Pat. No. 6,362,875 (Burkley) the contents of which are hereby fully incorporated by reference.

Referring to FIG. 16 in another embodiment of the invention the UARV 10 is configured with a utility system that comprises a surveillance system 470 capable of performing surveillance operations. In the preferred embodiment the primary components of a surveillance UARV 10 comprise an omni-directional vertical lift helicopter drone with thrusters 20 attached to a UARV body 30, a mounting mechanism 40 comprising a mounting arm 60 having a proximal end attached to the UARV body 30 and a distal end with a mounting grip mechanism 70, and a surveillance system 470.

In a preferred embodiment of the surveillance UARV 10 the surveillance system 50 comprises a video camera system that is turret mounted on the UARV body 30. The surveillance turret 480 can rotate in the horizontal and vertical planes providing a large field of view for the surveillance system 50. It is contemplated that surveillance system 50 may be comprised of sensor systems that can detect a variety of information, including special cameras (e.g. infra-red), motion detectors, audio pickup equipment, radio transmission receivers, etc. . . .

In an alternative contemplated embodiment of the UARV 10 the surveillance system may be a tool component 370 that is attached to a tool arm 360 of the UARV 10. The tool arm 360 may be used to maneuver the surveillance system (e.g. a video camera) into a position for a better view, including one away from the UARV body 30. The tool arm 360 can thus possibly improve the field of view for the tool component surveillance system, and possibly enable better concealment of the UARV body 30 and mounting mechanism.

By way of example and not limitation a UARV with a surveillance system may be launched from a remote location under cover of darkness and be mounted covertly on a tree by having the UARV mounted amongst the branches and leaves of the tree with the ability to use the surveillance arm to extend the camera system just far enough out of the tree foliage to obtain the desired surveillance view.

Surveillance information such as video, audio, sensor measurements etc. . . . may be acquired and recorded by the surveillance system and stored on a storage medium located on or in the UARV body 30. Once the surveillance mission is completed the surveillance UARV can be dismounted from the tree (or other object) and return to the owner/ operator with any stored surveillance information. Alternatively, information recorded by the surveillance UARV may be transmitted contemporaneously, or at predetermined times, to a remote location using a radio communication system located on or in the UARV body 30.

Figure 15:
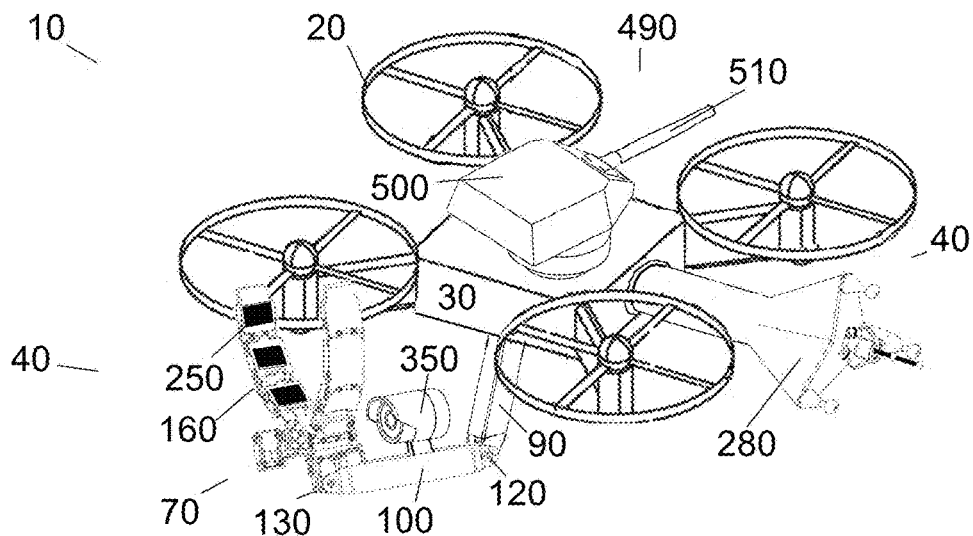
FIG. 15 is an elevated right front perspective view of a tactical weapons embodiment of the UARV of the present invention having a a mounting arm with a mounting grip mechanism, a vehicle dock connector, and a weapons system.

Referring to FIG. 15 in another embodiment of the invention the UARV 10 has a utility system that is a tactical weapons system 490 that is capable of aiming and firing one or more weapons 500. In the preferred embodiment the UARV with a tactical weapons system 490 comprises an omni-directional vertical lift helicopter drone with thrusters 20 attached to a UARV body 30, a mounting mechanism 40 comprising a mounting arm 60 having a proximal end attached to the UARV body 30 and a distal end with a mounting grip mechanism 70, and a weapons system 490 mounted on UARV body 30.

In a preferred embodiment of the UARV with a tactical weapons system 490 the weapons system 490 comprises a gun 500 attached to a weapons turret 510 that is mounted on the UARV body 30. The weapons turret 510 can rotate in the horizontal and vertical planes providing a large target field for weapons system 490. In an alternative contemplated embodiment of the tactical UARV the weapons system may be a tool component attached to a movable tool arm as described elsewhere herein. The tool arm may be used to maneuver the weapon system into a position for better targeting, including one away from the UARV body 30. The tool arm can thus possibly offer a larger target field, and possibly enable better concealment of the UARV body 30 and mounting mechanism. The weapons of a weapon system are not limited to any particular type of weapon or ammunition, and may comprise any type of device that is used in security or defense such as, by way of example and not limitation, firearms of various calibers (e.g. shotguns, rifles, canons, etc. . . . ), devices that use non-lethal ammunition (e.g. bean bags, rubber bullets etc. . . . ), devices that disperse chemical agents (e.g. pepper spray or tear gas), energy discharge weapons (e.g. lasers), taser systems, sensory overload weapons (e.g. light, sound, etc. . . . ) and others.

The contemplated embodiment of the tactical UARV can hover adjacent to a mounting location on an object which has an advantageous perspective for utilizing weapons against intended targets, such as a tree, lamp post or an electric or telephone utility pole. By way of example and not limitation a tactical UARV may be launched from a remote location under cover of darkness and be mounted on a tree in an area where there may be enemy targets. By having the UARV mounted amongst the branches and leaves of the tree with the ability to use the tactical arm to extend the weapon just far enough out of the tree foliage to fire the UARV may remain concealed from enemy targets.

Referring to FIG. 11 In another embodiment of the invention the utility system of UARV 10 is a communications system 520 that is capable of performing communication operations with one or more communication devices 530. In the preferred embodiment the UARV 10 with a communications system 520 comprises an omni-directional vertical lift helicopter drone with thrusters 20 attached to a UARV body 30, a mounting mechanism 40 comprising a mounting arm 60 having a proximal end attached to the UARV body 30 and a distal end with a mounting grip mechanism 70, and a communications device 530.

In a preferred embodiment of the UARV 10 with a communications system 520 the communications device 530 comprises a radio in or on the UARV body 30 that has one or more radio antennae 540 moveably mounted on the UARV body 30. The ability to maneuver and then securely mount the radio at a desired location with a better line of sight for transmission and reception can help improve communications. In an alternative contemplated embodiment of the UARV with a communications system 520 the system may include an antennae tool component that is attached to a movable tool arm as described elsewhere herein. The antennae tool component attached to the moveable arm may be fixed, moveable, or telescoping. The tool arm may be used to maneuver the antennae tool component into a position for better transmission or reception, including one away from the UARV body 30. The tool arm can thus possibly offer improved transmission and reception, and possibly enable better concealment of the UARV body 30 and mounting mechanism. While the preferred embodiment described uses radio waves for communication, it should be noted that the present invention is not limited to radio communication, and may use other forms of transmission and reception that may utilize any part of the electromagnetic spectrum (e.g. lasers, or visually perceptible transmissions), sound waves, etc. . . . .

A contemplated embodiment of the UARV 10 with a communications system 520 can hover adjacent to a mounting location 150 on an object 140 which has an advantageous location for receiving and transmitting communications, such as at the top of a tree, tower, building, flag pole, lamp post or an electric or telephone utility pole. The mounting arm 60 maneuvers jaws 160 of the mounting grip mechanism 70 onto and/or around the mounting location 150. Once the mounting grip mechanism 70 is clamped onto the mounting location 150 and the mounting arm 60 locked in position the communications UARV becomes securely mounted to the object 140 at the mounting location. Once securely mounted to the object by the mounting mechanism the UARV can enter a parked mode to conserve energy, reduce noise and vibration, and reduce electromagnetic interference, by powering down the flight systems.

Referring to FIGS. 1-2 it is contemplated that in some embodiments of the UARV that one or more screens 550 would be incorporated to protect one or more portions of the UARV 10, such as the thrusters 20, from any debris that may be encountered during UARV transport or utility operations. Such debris may, by way of example and not limitation, be in the form of foliage from trees that tree trimming operations are being performed on, shell casings ejected during use of a weapons system, falling parts or tools from a repair or maintenance operation.

Figure 12:
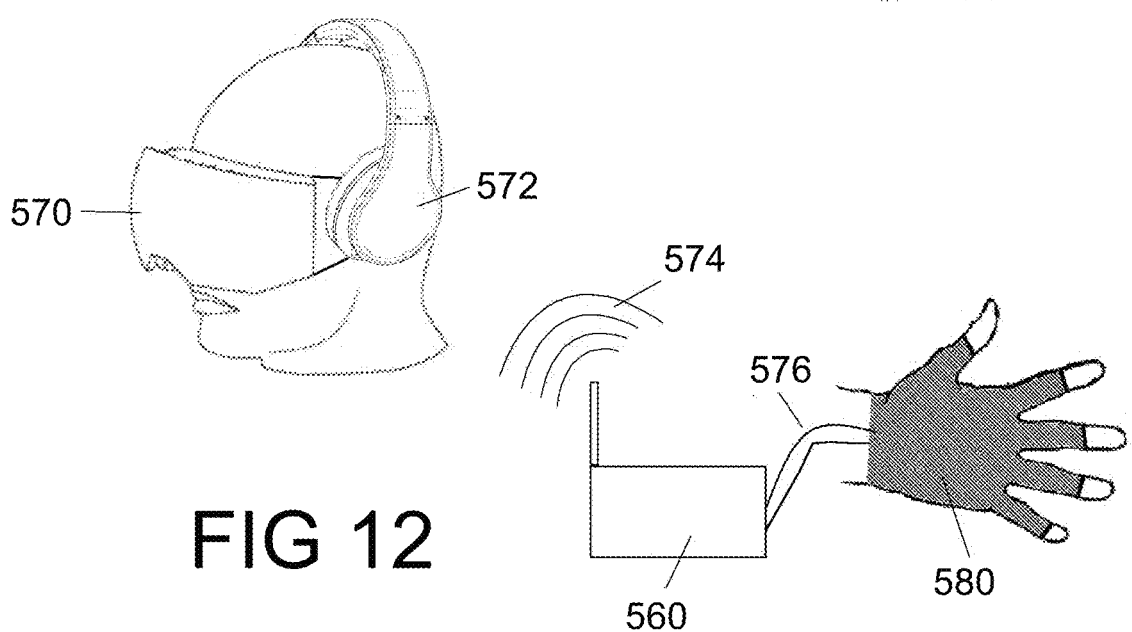
FIG. 12 is a schematic of an exemplary embodiment of a remote controller system for use with the UARV of the present invention.

Referring to FIG. 12 it is contemplated that embodiments of the UARV of the present invention may be operated remotely by an operator using a remote controller that permits the operator to navigate and control operations of the UARV in near real-time, including operations of flying, hovering, mounting and dismounting the UARV, as well as executing the various utility functions of the UARV such as manipulation of a tool component.

Figure 13A:
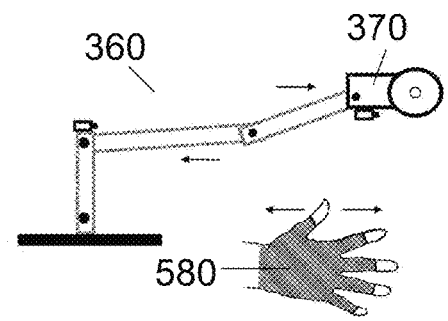
FIGS. 13A-13E are an illustration of hand gesture controls of the UARV tool arm and tool component with the remote controller system of FIG. 12.
Figure 13B:
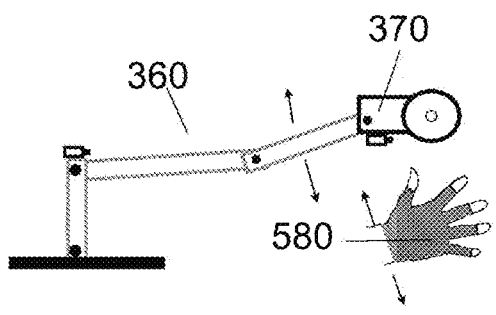
Figure 13C:
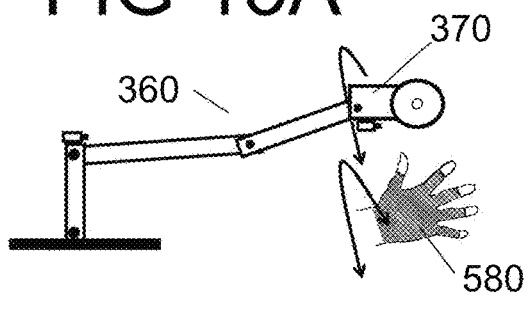
Figure 13D:
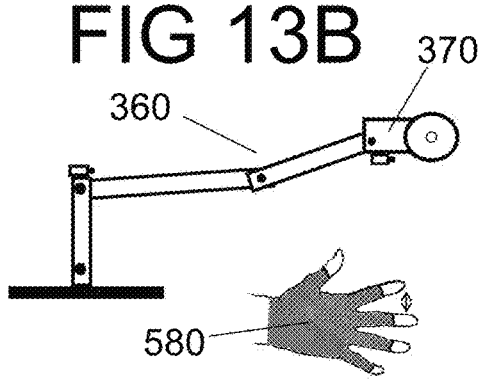
Figure 13E:
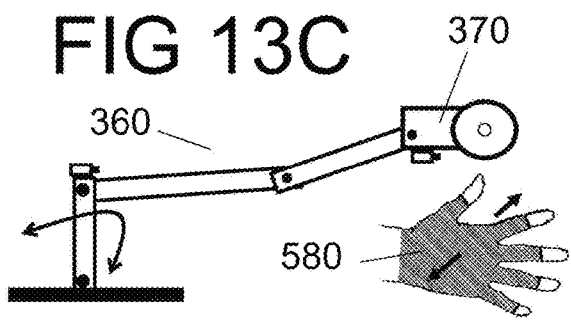

By way of example and not limitation it is contemplated that the UARV of the present invention could be controlled by an operator using a remote controller that comprises a system having a controller module (e.g. a computing device) 560, visual display device 570 operably connected to, or integrated with, said controller module 560 allowing the operator to receive visual information, audio device 572 operably connected to, or integrated with, said controller module 560 allowing the operator to receive audio information, and a control mechanism 580 operably connected to, or integrated with, said controller module 560 that can be manipulated by the operator to remotely control the UARV. In a contemplated embodiment the visual display 570, audio device 572, and/or control mechanism 580 would be wearable (e.g. a visual display and audio headset and glove controller) by the operator such as is shown, by way of example, and not limitation in U.S. Pat. No. 6,016,385 (Yee et al) the contents of which are fully incorporated by reference, and U.S. Pat. No. 6,128,004 (McDowall et al) the contents of which are fully incorporated by reference. Referring to FIGS. 13A-13E in another contemplated embodiment the remote controller would be capable of sensing an operators physical movements and/or expressions and communicating them as commands to the remote UARV, such as is shown and described in U.S. Pat. No. 9,079,313 (Olivier, I I I et al) the contents of which are fully incorporated by reference. FIG. 13A shows an embodiment of glove controller that extends tool arm 360 when the thumb is moved forward. FIG. 13B shows an embodiment of glove controller that moves tool arm 360 up and down when the glove is moved up and down. FIG. 13C shows an embodiment of glove controller that rotates tool arm 360 when the glove is rotated. FIG. 13D shows an embodiment of glove controller that activates tool component 370 when fingers of the glove controller are moved. FIG. 13E shows an embodiment of glove controller that moves tool arm 360 side to side when the glove is moved side to side.

It is contemplated that visual display 570, audio device 572, control mechanism 580, and controller module 560 may be integrated into the same housing, or that visual display 570, audio device 572, and/or control mechanism 580 may be operably connected to controller module 560 by way of radio communication 574 (e.g. Bluetooth) and/or a wired connection 576.

Figure 14:
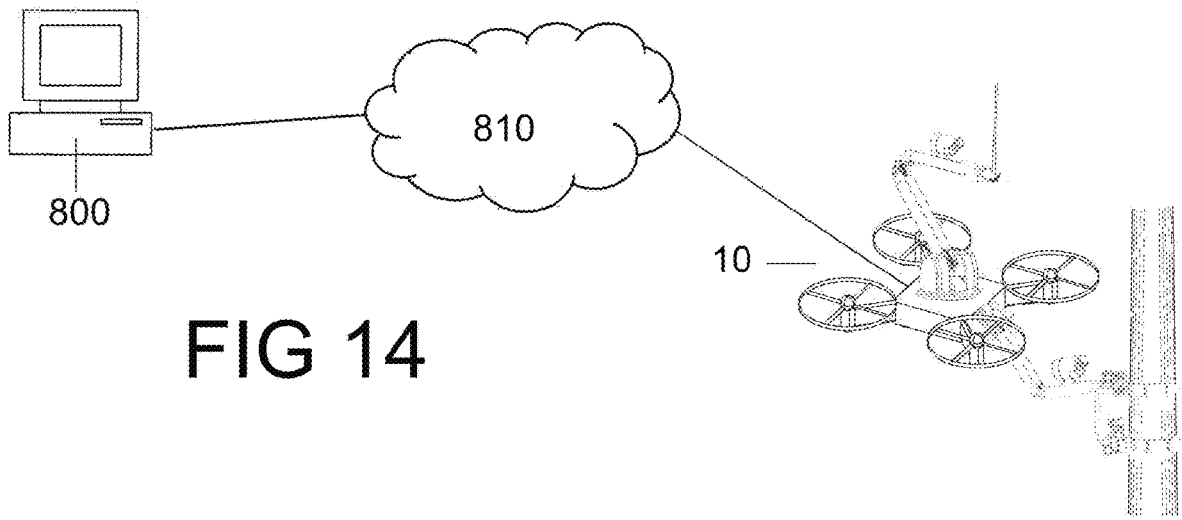
FIG. 14 is a schematic of a user network interface system with an UARV of the present invention.

Referring to FIG. 14 it is contemplated that a person (i.e. a customer) who desires to receive services from an UARV 10 of the present invention (e.g. palm tree trimming services) may create a user account with an owner or operator of the UARV. It is contemplated that a person may create such a user account through a network interface 800 (i.e. a general purpose computer system with network access to the internet) that communicates information to a cloud based computer system 810 (e.g. network server hosted website) that is owned and/or controlled by UARV 10 owner or operator. Through the network interface 800 a customer may communicate to the cloud based computer system user information, service site location, service type desired, service schedule desired, and service payment information. Payments may be processed by owner or operator of UARV 10 through conventional electronic payment systems (e.g. credit card, PayPal, bank transfer etc. . . . ). Once payments are processed by the owner or operator of UARV 10 the service information (e.g. site coordinates, service type, and schedule) for the customer may be communicated to and/or stored in UARV, preferably through a network interface to UARV 10.

It is contemplated that in commercial practice multiple UARVs of the present invention could be transported by a vehicle (e.g. a truck, ship, etc. . . . ) with a specialized platform and/or ramp for transporting, launching, and landing the UARV's at a given location.

It is contemplated that embodiments of the UARV of the present invention may operate autonomously using preprogrammed instructions stored in and executed from onboard computing systems and an auto-pilot system for the same navigation and control operations.

The above description discloses several configurations and uses of the present invention. This invention is susceptible to modifications in the configurations and uses, as well as alterations in the manufacturing methods and equipment. Such modifications will become apparent to those skilled in the art from a consideration of this disclosure or practice of the invention disclosed herein. Consequently, it is not intended that this invention be limited to the specific embodiments disclosed herein, but that it covers all modifications and alternatives coming within the true scope and spirit of the invention as embodied in the attached claims.

The invention claimed is:

1. An unmanned aerial vehicle system comprising:
   a vehicle body,
   a vehicle thruster,
   a first object mounting mechanism comprising;
      an object docking port comprising a post; and
      a vehicle dock connector having a proximal end that is attached to the vehicle body and a distal end that is located away from the vehicle body, with the distal end comprising a connector sleeve having an opening for receiving the object docking port post.

2. The unmanned aerial vehicle system of claim 1 further comprising a tool arm and a tool component.

3. The unmanned aerial vehicle system of claim 2 where the tool component comprises a surveillance system.

4. The unmanned aerial vehicle system of claim 2 where the tool component comprises a weapons system.

5. The unmanned aerial vehicle system of claim 2 where the tool component comprises a weapons system and a surveillance system.

6. The unmanned aerial vehicle system of claim 1 further comprising a second object mounting mechanism.

7. The unmanned aerial vehicle system of claim 6 where the second object mounting mechanism comprises a grip arm.

8. The unmanned aerial vehicle system of claim 7 where the grip arm is multi-segmented.

9. The unmanned aerial vehicle system of claim 6 where the second object mounting mechanism comprises a mounting arm and a grip mechanism.

10. The unmanned aerial vehicle system of claim 6 further comprising a tool arm and a tool component.

11. The unmanned aerial vehicle system of claim 10 where the tool component comprises a surveillance system.

12. The unmanned aerial vehicle system of claim 10 where the tool component comprises a weapons system.

13. The unmanned aerial vehicle system of claim 10 where the tool component comprises a weapons system and a surveillance system.

14. The unmanned aerial vehicle system of claim 1 further comprising an inductive object power bus coil associated with the object docking port post, and an inductive vehicle power bus coil associated with the connector sleeve.

15. The unmanned aerial vehicle system of claim 14 further comprising a tool arm and a tool component.

16. The unmanned aerial vehicle system of claim 14 further comprising a second object mounting mechanism.

17. The unmanned aerial vehicle system of claim 16 further comprising a tool arm and a tool component.

18. The unmanned aerial vehicle system of claim 17 where the second object mounting mechanism comprises a grip arm.

19. The unmanned aerial vehicle system of claim 18 where the grip arm is multi-segmented.

20. The unmanned aerial vehicle system of claim 17 where the second object mounting mechanism comprises a mounting arm and a grip mechanism.

* * * * *